United States Patent
Sakatani

(10) Patent No.: US 10,750,032 B2
(45) Date of Patent: Aug. 18, 2020

(54) IMAGE INSPECTION APPARATUS

(71) Applicant: Konica Minolta, Inc., Chiyoda-ku, Tokyo (JP)

(72) Inventor: Kazuomi Sakatani, Machida (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 16/255,095

(22) Filed: Jan. 23, 2019

(65) Prior Publication Data

US 2019/0238686 A1    Aug. 1, 2019

(30) Foreign Application Priority Data

Jan. 31, 2018    (JP) .................. 2018-015375

(51) Int. Cl.
    *H04N 1/58*    (2006.01)
    *H04N 1/00*    (2006.01)

(52) U.S. Cl.
    CPC ..... *H04N 1/00045* (2013.01); *H04N 1/00005* (2013.01); *H04N 1/00029* (2013.01); *H04N 1/00082* (2013.01)

(58) Field of Classification Search
    CPC .......... H04N 1/00045; H04N 1/00822; H04N 1/00029
    USPC ............................. 358/1.13, 1.18, 504, 518
    See application file for complete search history.

(56) References Cited

U.S. PATENT DOCUMENTS

2015/0146264 A1*   5/2015   Ikari .................. H04N 1/00013
                                                          358/406
2017/0257494 A1*   9/2017   Ikari .................. H04N 1/00053

FOREIGN PATENT DOCUMENTS

JP           2009151236 A       9/2009

* cited by examiner

*Primary Examiner* — Jamares Q Washington
(74) *Attorney, Agent, or Firm* — Buchanan Ingersoll & Rooney PC

(57) ABSTRACT

An image inspection apparatus includes a hardware processor that performs an image diagnosis on the basis of a read image obtained by reading images printed in both sides of a recording medium, wherein the hardware processor: acquires a read image obtained by reading an image on the recording medium to which at least a first chart and a second chart are output; and performs a diagnosis by determining a side to be used in the diagnosis depending on an image diagnosis item on the basis of the read image.

18 Claims, 16 Drawing Sheets

IMAGE INSPECTION APPARATUS

The entire disclosure of Japanese patent Application No. 2018-015375, filed on Jan. 31, 2018, is incorporated herein by reference in its entirety.

BACKGROUND

Technological Field

The present invention relates to an image inspection apparatus that performs an image diagnosis on the basis of a read image obtained by reading an image formed on a recording medium.

Description of the Related Art

In the field of an image forming apparatus such as a copier, a printer, and a multifunction peripheral, there is known a device having a function of adjusting an image quality or determining abnormality in an image using image reading data obtained by reading an image on a sheet. For example, a chart is printed on a sheet, and this is read. On the basis of a result of reading this, determination on a grayscale, a highest density, an edge quality, a line width, or a color drift, detection of a streak or stain, determination on a stain in a white portion, or the like are performed. Image quality adjustment, mechanical adjustment, or the like is performed as necessary on the basis of a result of the determination.

For example, JP 2009-151236 A discloses an inspection apparatus including a reading means that reads a backside of a side having an image formed by an image forming apparatus, and an inspection means that inspects a stain on the backside of a recording sheet on the basis of the image read by the reading means.

However, in a case where a pattern recorded on a sheet is read, and image quality adjustment or the like is performed as necessary, all the necessary patterns are printed and diagnosed even when the image adjustment is not necessary, or the image quality is sufficiently adjusted by performing specific adjustment. Therefore, materials such as a sheet or toner and time are consumed uselessly. In addition, in a case where stain determination on a white portion is performed during execution of a job as described in JP 2009-151236 A, it is difficult to print a pattern for image adjustment, and it is necessary to separately perform a pattern print work.

SUMMARY

In view of the aforementioned background, an object of the invention is to provide an image inspection apparatus capable of suitably diagnosing an image while saving materials and time.

To achieve the abovementioned object, according to an aspect of the present invention, an image inspection apparatus reflecting one aspect of the present invention comprises a hardware processor that performs an image diagnosis on the basis of a read image obtained by reading images printed in both sides of a recording medium, wherein the hardware processor: acquires a read image obtained by reading an image on the recording medium to which at least a first chart and a second chart are output, the first chart having a pattern that is printed only on a first side of the recording medium and is not printed on the other side in a one-side mode, the second chart having a pattern that is printed on one side of the recording medium different from that of the recording medium of the first chart and is not printed on the other side to provide a white image in a duplex mode; and performs a diagnosis by determining a side to be used in the diagnosis depending on an image diagnosis item on the basis of the read image.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, an image inspection apparatus according to an embodiment of the present invention will be described with reference to the drawings. However, the scope of the invention is not limited to the disclosed embodiments.

Figure 1:
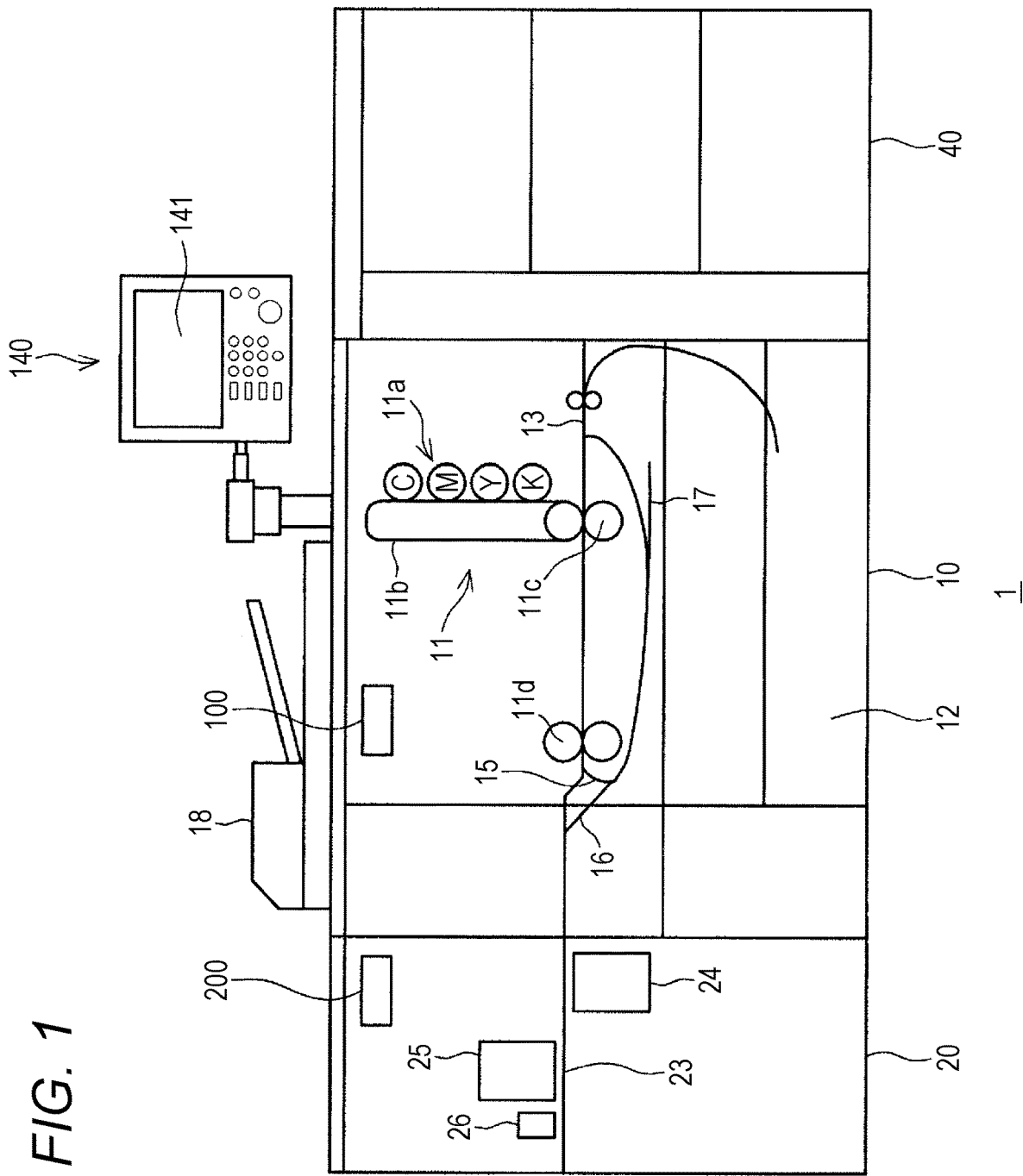
FIG. 1 is a diagram illustrating a configuration of an image forming apparatus according to an embodiment of the invention.

As illustrated in FIG. 1, the image forming apparatus 1 has an apparatus body 10 that performs image formation. A sheet feeding device 40 is provided in a front stage of the apparatus body 10, and a reading device 20 is provided in a rear stage of the apparatus body 10. Each apparatus and the apparatus body are electrically and mechanically connected to each other, and are configured to communicate with each other and convey a sheet. Note that, in this embodiment, the image forming apparatus 1 can perform a diagnosis for an image as an image inspection apparatus according to the present invention.

The sheet feeding device 40 has a plurality of sheet feeding stages for storing sheets. The sheet stored in the sheet feeding stage can be supplied to the apparatus body 10 of the rear stage. The sheet corresponds to a recording medium according to the present invention. Note that, according to the present invention, a material of the recording medium is not limited to paper, and may include cloth, plastic, or the like.

The apparatus body 10 has a main body sheet feeder 12 provided with a plurality of sheet feed trays in a lower part of a casing. Sheets are stored in each sheet feed tray of the main body sheet feeder 12. The sheet corresponds to a recording medium according to the present invention. A material of the recording medium is not limited to paper, and may include cloth, plastic, or the like.

A conveyance path 13 is provided inside the casing of the apparatus body 10, so that the sheet supplied from the sheet feeding device 40 or the main body sheet feeder 12 is conveyed to the downstream side along the conveyance path 13.

An image forming part 11 for forming an image on a sheet is provided in the middle of the conveyance path 13.

The image forming part 11 has a photoreceptor 11a for each color (including cyan, magenta, yellow, and black). A charger, a laser diode (LD), a developer, a cleaning unit, and the like (not shown) are provided around the photoreceptor 11a. In addition, the image forming part 11 has an intermediate transfer belt 11b in a position making contact with the photoreceptor 11a for each color. The intermediate transfer belt 11b makes contact with a sheet on the conveyance path 13 in a secondary transfer unit 11c provided in the middle. Furthermore, in the conveyance path 13, a fixer 11d is provided in a downstream side of the secondary transfer unit 11c.

In a case where an image is formed on a sheet, the photoreceptor 11a is uniformly charged by the charger, and laser light is irradiated from the LD to the photoreceptor 11a so as to form a latent image on the photoreceptor 11a. The latent image on the photoreceptor 11a is developed by the developer to form a toner image. The toner image on the photoreceptor 11a is transferred to the intermediate transfer belt 11b, and the image on the intermediate transfer belt 11b is transferred to the sheet by the secondary transfer unit 11c. The sheet formed with the image and transferred along the conveyance path 13 is subjected to fixation of the image by the fixer 11d.

Note that, although the image forming part 11 performs multicolor image formation in this embodiment, the image forming part 11 according to the invention may perform image formation using a single color such as monochrome.

A reverse conveyance path 15 branches from the conveyance path 13 in the downstream side of the fixer 11d. A downstream conveyance path 16 branches in the middle of the reverse conveyance path 15 and is coupled to the conveyance path 13 in the downstream side of the branch point of the reverse conveyance path 15. A retreating conveyance path 17 branches from the reverse conveyance path 15 in the downstream side of a branch point of a downstream conveyance path 16. A downstream end of the reverse conveyance path 15 joins the conveyance path 13 in the upstream side of the image forming part 11. The conveyance path 13 is coupled to the conveyance path 23 of the reading device 20 coupled to a rear stage in a straight direction.

In a case where an image is formed on a single side of the sheet, the sheet subjected to image formation is directly and straightly conveyed along the conveyance path 13 to the conveyance path 23 of the reading device 20.

In a case where a face of the sheet subjected to the image formation is switched, the sheet is conveyed to the reverse conveyance path 15 over the branch point of the downstream conveyance path 16, is conveyed reversely along the reverse conveyance path 15, and is then conveyed to the downstream side of the conveyance path 13 along the downstream conveyance path 16.

In a case where an image is formed on the backside of the sheet by reversing the sheet, the sheet is fed from the conveyance path 13 to the reverse conveyance path 15, and is fed to the retreating conveyance path 17. Then, the sheet is reversed and is fed to the downstream side of the reverse conveyance path 15 to return to the conveyance path 13. Then, an image is formed on the backside of the sheet in the image forming part 11.

The apparatus body 10 has a manipulation unit 140 in an upper part of the casing. The manipulation unit 140 has an LCD 141 having a touch panel and a manipulation key group such as a numeric keypad, so that information can be displayed, and a manipulation input can be received. The manipulation unit 140 corresponds to a display unit and also serves as a manipulation unit.

Note that, although the manipulation unit 140 is formed by integrating a manipulation unit and a display unit in this embodiment, they may not be integrated. For example, the manipulation unit may include a mouse, a tablet, a terminal, or the like. In addition, the LCD 141 may also be mobile.

In the upper part of the casing of the apparatus body 10, an automatic document feeder (ADF) 18 is provided in a place where the manipulation unit 140 is not placed. The automatic document feeder (ADF) 18 automatically feeds the documents set on a document load tray, and the document fed by the automatic document feeder (ADF) 18 is read by a scanner unit 130 of FIG. 2.

Note that the document may also be read on a platen glass (not shown).

The printed matter output from the image forming apparatus 1 may also be set in the scanner unit 130 for reading. For example, the sheet output from the image forming apparatus 1 may be set and read in order to read the image formed on the sheet. In this case, the scanner unit 130 may also serve as an image reading part.

The apparatus body 10 has an image control unit 100. The image control unit 100 controls the entire image forming apparatus 1 and may include a CPU or a program, a memory, or the like that operates as the CPU. Note that the image control unit 100 may also be provided outside the apparatus body. According to the present invention, a part of the functions of the image control unit 100 serve as a diagnosis unit according to the present invention.

The reading device 20 has a conveyance path 23, so that the sheet introduced from the apparatus body 10 is conveyed along the conveyance path 23. In the downstream side of the conveyance path 23, the sheet may be directly discharged or may be conveyed to a sheet discharge device or the like (not shown) in the rear stage.

In the middle of the conveyance path 23, an image reading part 24 that reads an image on a lower side of the sheet conveyed along the conveyance path 23 and an image reading part 25 that reads an image on an upper side of the sheet are provided. The image reading part 24 is positioned in the upstream side of the image reading part 25 in the sheet feeding direction. In addition, a colorimeter 26 that measures color of the image on the upper side of the sheet is provided in the downstream side of the image reading part 25.

The image reading parts 24 and 25 may include a CCD sensor, a CMOS sensor, or the like to read an image on a sheet conveyed along the conveyance path 23 across the entire direction crossing the feeding direction. A result of the reading in the image reading parts 24 and 25 and the colorimeter 26 is transmitted to the reading control unit 200 provided in the reading device 20. The reading control unit 200 may include a CPU or a program, a memory, or the like operating as the CPU. Note that the reading control unit 200 may be provided outside the apparatus body.

Note that, although images on both sides of the sheet are read by a pair of image reading parts in the aforementioned description, a reverse conveyance path may be provided in front of and behind the image reading part to reversely convey the sheet to read images on both sides of the sheet using a single image reading part.

Although the reading device is mechanically coupled to the apparatus body in an in-line manner in this embodiment, the reading device may not be mechanically coupled to the image forming apparatus. The reading result may be sent to the image control unit via a communication line or a network, or data may be moved using a portable memory medium.

Although the image reading parts 24 and 25 are provided in the reading device 20 in this embodiment, the image reading parts may be provided, for example, in the apparatus body 10. In addition, the reading device may not be mechanically coupled to the image forming apparatus. Even in a mechanically offline state, the function of the present invention can be achieved as long as the reading result can be obtained.

Note that, in this embodiment, the image control unit 100 diagnoses an image on the basis of the read image read by the reading device 20, and the read image read by the image reading part 24 or 25 can be transmitted from the reading control unit 200 to the image control unit 100. Alternatively, the reading control unit 200 may perform the image diagnosis for the read image. In this case, the reading control unit corresponds to a diagnosis unit according to the present invention. In this case, the reading control unit 200 may instruct the image control unit 100 to perform image adjustment or mechanical adjustment as necessary. In a case where the reading control unit 200 performs the image diagnosis, the image inspection apparatus may be configured by the image forming apparatus, or the reading device may corresponds to the image inspection apparatus.

Note that the image diagnosis may be performed using a method known in the art without limiting to a particular method according to the present invention.

Although the image forming apparatus 1 includes the sheet feeding device 40, the apparatus body 10, and the reading device 20 in this embodiment, the number of devices included in the image forming apparatus according to the present invention or their types are not limited thereto, and the image forming apparatus 1 may only include the apparatus body 10. In this case, the image reading part exists outside the image forming apparatus. In addition, another device may also be included in addition to the sheet feeding device 40, the apparatus body 10, and the reading device 20.

Figure 2:
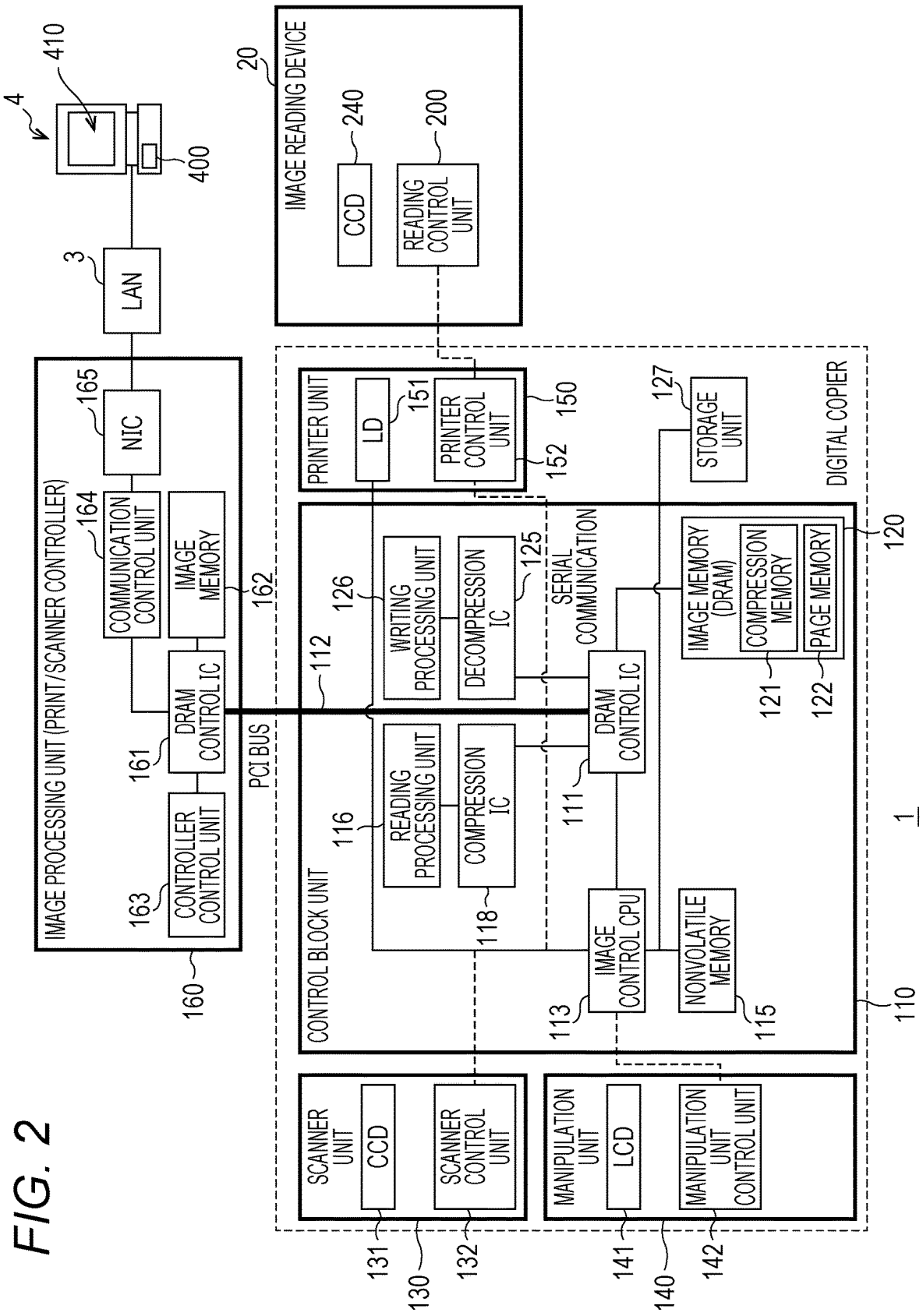
FIG. 2 is a diagram illustrating a control block of the image forming apparatus according to an embodiment of the invention.

Next, function blocks of the image forming apparatus 1 will be described with reference to FIG. 2.

The image forming apparatus 1 includes a digital copier having a control block unit 110, a scanner unit 130, a manipulation unit 140, and a printer unit 150, an image processing unit (print/scanner controller) 160, and the reading device 20. The image processing unit (print/scanner controller) 160 processes the image data acquired from an external device or the like.

The control block unit 110 has a PCI bus 112, and a DRAM control IC 111 is connected to the PCI bus 112. In addition, an image control CPU 113 is connected to the DRAM control IC 111.

A nonvolatile memory 115 is connected to the image control CPU 113. The nonvolatile memory 115 stores a program executed by the image control CPU 113, setting data such as mechanic setting information, process control parameters, a criterion for determining whether or not an image is correct by comparing a read image and a reference image, and the like.

The image control CPU 113 may check a comprehensive state of the image forming apparatus 1 by executing the program and control the image forming apparatus 1. The image control CPU 113 may convey a sheet, perform operations such as image formation, process image data for forming an image, perform processing such as the image diagnosis, and the like. In this embodiment, the image control CPU 113 and a program operating in the image control CPU 113 constitute the diagnosis unit according to the present invention. This program includes a program according to the present invention. Note that the program may be stored in a hard disk drive (HDD) other than the nonvolatile memory or may be stored in a portable recording medium.

A storage unit 127 is further connected to the image control CPU 113. The storage unit 127 may include a RAM, a HDD, a SSD, or the like to store desired information such as image data, job data, programs, parameters, chart images, and parameters used in the image diagnosis. A plurality of devices may also be provided in the storage unit 127.

A scanner control unit 132 of the scanner unit 130 is also connected to the image control CPU 113 so as to enable serial communication.

The scanner unit 130 includes a CCD 131 that optically reads an image on a sheet, and a scanner control unit 132 that controls the entire scanner unit 130. The scanner control unit 132 controls each part of the scanner unit 130 by receiving an instruction of the image control CPU 113. The scanner control unit 132 includes a CPU, a storage unit, a program operating as a CPU, or the like. A reading processing unit 116 is connected to the CCD 131.

A manipulation unit control unit 142 of the manipulation unit 140 is further connected to the image control CPU 113 so as to enable serial communication. The manipulation unit 140 includes a touch panel type LCD 141 and a manipulation unit control unit 142.

Using the touch panel type LCD 141, a manipulation can be input and information can be displayed. The manipulation unit control unit 142 may control the entire manipulation unit 140 on the basis of an instruction of the image control CPU 113 and transmit information to the image control CPU 113. The manipulation unit control unit 142 may include a CPU, a storage unit, a program operating the CPU, or the like.

Using the manipulation unit 140, an image formation condition in the image forming apparatus 1 can be set, an operation control condition such as an operation command can be input, and setting details, a mechanical state, and information can be displayed, and the like.

The image control CPU 113 causes the image reading part to read a printed matter to perform the image diagnosis on the basis of the acquired read image. In the image diagnosis, a basic image quality diagnosis can be performed using a basic image quality diagnosis pattern printed on a sheet. In the basic image quality diagnosis, a page image quality such as a grayscale, a highest density, an edge quality of a patch portion, a development memory, and graininess, or a line image quality such as a line width and a color drift can be diagnosed. However, the present invention is not limited to the content of the diagnosis, and the number of diagnoses is not limited as well. In addition, in the image diagnosis, an image noise can be diagnosed using an image noise diagnosis pattern printed on a sheet. The image noise may include, for example, a streak, banding, a dot, a stain, or the like.

A printer control unit 152 of the printer unit 150 is connected to the image control CPU 113 so as to enable serial communication.

The printer unit 150 has an LD 151 and a printer control unit 152. The printer control unit 152 controls the entire printer unit 150 on the basis of an instruction of the image control CPU 113 and controls conveyance of a sheet or an image formation operation. The printer unit 150 includes the image forming part 11, the conveyance paths 13 and 23, or the like.

The LD 151 collectively refers to laser diodes for each color. The LD 151 forms a latent image in the photoreceptor on the basis of the image data processed by the writing processing unit 126 to perform image formation.

An image memory (DRAM) 120 is connected to the DRAM control IC 111.

The image memory (DRAM) 120 stores image data acquired by the scanner unit 130 or image data acquired via a LAN 3 and includes a compression memory 121 that stores compressed image data and a page memory 122 that stores uncompressed image data.

The compression memory 121 may store data obtained by compressing image data received from the outside or the like. The page memory 122 may store image data decompressed for image formation, data regarding a reference image used in determination on whether or not the read image is suitable, and the like.

The image memory (DRAM) 120 may store image data or setting data for a job to be output. Note that the job data may also be stored in the storage unit 127.

Note that image data regarding a plurality of jobs may be stored in the image memory 120 using the DRAM control IC 111. That is, image data regarding a reserved job may also be stored in the image memory 120.

The compression IC 118 is connected to the DRAM control IC 111, and a reading processing unit 116 is connected to the compression IC 118.

The reading processing unit 116 performs a predetermined processing such as shading for the image data acquired by the CD 131 of the scanner unit 130.

The compression IC 118 can compress image data, and the compressed image data is stored in the compression memory 121.

A decompression IC 125 is connected to the DRAM control IC 111, and the writing processing unit 126 is connected to the decompression IC 125.

The decompression IC 125 decompresses the compressed image data, and the decompressed data is used for image formation or the like after it is stored in the page memory 122 once.

The writing processing unit 126 performs a predetermined processing for the image data for image formation, and the processed image data is sent to the LD 151 of the printer unit 150 to perform image formation.

The reading control unit 200 of the reading device 20 is connected to a printer control unit 152 of the printer unit 150.

The reading device 20 has a CCD 240 that reads an image and a reading control unit 200 that controls the CCD scanner. The reading control unit 200 includes a CPU, a storage unit, a program, or the like. The reading control unit 200 may control the entire reading device 20, read an image, transmit the read image data, or the like in response to an instruction of the image control CPU 113.

A DRAM control IC 161 of the image processing unit (print/scanner controller) 160 is connected to the PCI bus 112.

In a case where the image forming apparatus is used as a network printer or a network scanner, the image processing unit (print/scanner controller) 160 causes the image forming apparatus 1 to receive the image data or the like from an external device 4 or the like connected to the LAN 3 or transmit the image data acquired by the scanner unit 130 to an external device, and the like.

An image memory 162 of the image processing unit (print/scanner controller) 160 is connected to the DRAM control IC 161. The image memory 162 includes a DRAM or the like. In addition, in the image processing unit (print/scanner controller) 160, a controller control unit 163 and a communication control unit 164 are connected to the DRAM control IC 161. The controller control unit 163 controls the entire image processing unit (print/scanner controller) 160. An NIC 165 is connected to the communication control unit 164, and the LAN 3 is connected to the NIC 165.

The external device 4 is connected to the LAN 3 to enable communication with the image forming apparatus 1. The external device 4 has an external device control unit 400 and an external device manipulation unit 410. The external device 4 may transmit print image data to the image forming apparatus 1 via the LAN 3, and the image forming apparatus 1 may form an image on a sheet on the basis of the print image data. In addition, the external device 4 may perform an image diagnosis on the basis of the read image obtained from the image forming apparatus 1. In this case, the external device control unit 400 serves as a diagnosis unit according to the present invention. Furthermore, the external device control unit 400 may control the image forming apparatus to perform image quality adjustment, mechanical adjustment, or the like on the basis of a result of the image diagnosis.

Next, a basic operation of the image forming apparatus 1 will be described.

First, a process of accumulating image data in the image forming apparatus 1 will be described.

In a case where image data is acquired using the scanner unit 130, an image of a document is optically read by the CCD 131 of the scanner unit 130. In this case, the image control CPU 113 instructs the scanner control unit 132 to control the operation of the CCD 131.

The image read by the CCD 131 is subjected to data processing in the reading processing unit 116 so that the image data is compressed using a predetermined method in the compression IC 118.

The reading processing unit 116 creates digital image data by applying various processing such as an analog signal processing, an analog-to-digital (A/D) conversion processing, and a shading processing to the image data read by the CCD 131. The compression IC 118 compresses the data using a predetermined method. The data compression method is not particularly limited.

The image data compressed by the compression IC 118 is stored in the compression memory 121 via the DRAM control IC 111. Note that the image data may also be stored in the storage unit 127. The image data stored in the compression memory 121 or the storage unit 127 may be managed as image data in a job by the image control CPU 113.

In a case where image data is acquired from the outside, for example, in a case where image data is acquired from an external device or the like via the LAN 3, the image data is received by the NIC 165 and is stored in the image memory 162 via the communication control unit 164 and the DRAM control IC 161. Such an operation is controlled by the controller control unit 163. In a case where an RIP processing is performed for the acquired image data, the image data is transmitted to the controller control unit 163, the RIP processing is performed, and the obtained raster image data is stored in the image memory 162. Note that the RIP processing may be performed by the image control CPU 113.

The data of the image memory 162 is transmitted to the page memory 122 through the DRAM control IC 161, the PCI bus 112, and the DRAM control IC 111, and is stored in the page memory 122. The data stored in the page memory 122 is sequentially transmitted to the compression IC 118 through the DRAM control IC 111 and is compressed. The compressed image data is stored in the compression memory 121 or the storage unit 127.

In a case where the image forming apparatus 1 outputs an image as a job, that is, in a case where the image forming apparatus 1 is used as a copier or a printer, the image data stored in the compression memory 121 or the storage unit 127 is transmitted to the decompression IC 125 through the DRAM control IC 111 to decompress the image data.

The decompressed image data is transmitted to the writing processing unit 126, and the writing processing unit 126 creates write data, so that the image is written to the photoreceptor using the LD 151. Then, development, transferring, and fixation are performed to form an image on a sheet.

Note that, when the job is output, whether or not an image diagnosis is performed or the like may be set using the manipulation unit 140.

In a case where the image forming apparatus 1 is used as a printer, a print condition may be set using a printer driver of the external device 4. Similar to the image, the print condition set in this case is transmitted to the external device 4, to the NIC 165, to the image memory 162, to the DRAM control IC 161 (controller), to the DRAM control IC 111 (main body), and to the page memory 122, and is stored in the page memory 122.

The external device 4 is connected to the image forming apparatus 1 via the LAN 3. Note that the LAN 3 may include other networks without a particular limitation, and a wide area network (WAN) or the like may also be employed regardless of whether it is wired or wireless.

Next, a chart used in the image diagnosis will be described with reference to FIG. 3.

Figure 3:
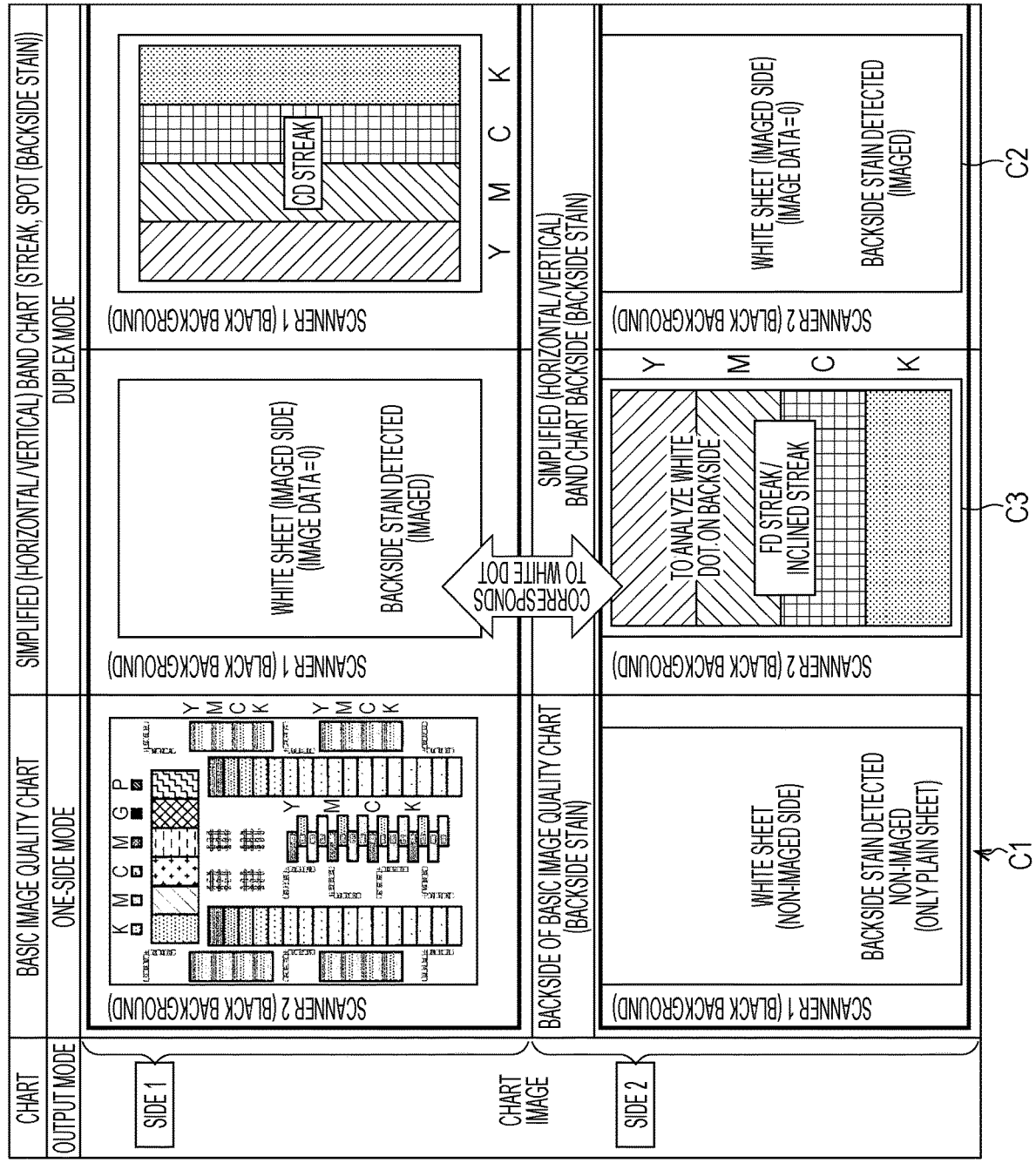
FIG. 3 is a diagram illustrating a chart used in an image diagnosis according to an embodiment of the invention.

In FIG. 3, three different sheets are horizontally arranged while their front and back sides are illustrated in upper and lower halves, respectively.

A left chart C1 corresponds to a first chart having a pattern formed on a first side of the sheet (in FIG. 3, illustrated as "SIDE 1") in a one-side mode. A backside of SIDE 1 is a white portion as an unprinted side (non-imaged side). Note that, in this example, a basic image quality diagnosis pattern is printed on SIDE 1 of a recording medium, and a pattern for diagnosing a grayscale, a highest density, an edge quality of a patch portion, a development memory, and graininess is printed. In each pattern, a chart having process colors such as yellow (Y), magenta (M), cyan (C), and black (K) are printed by changing their densities. In addition, other colors such as green (G) and purple (P) are also used.

When a sheet is output from the apparatus body 10, it is output in a face-up manner. For this reason, an image on SIDE 1 is read by the image reading part 25 (indicated as SCANNER 2 in the drawing), an image on SIDE 2 is read by the image reading part 24 (SCANNER 1). Note that the image reading parts 24 and 25 have a black background, so that a region outside the sheet has a black color in the read image.

In the basic image quality diagnosis pattern formed in the chart C1, image quality adjustment may be performed only for the image quality necessitating adjustment depending on a diagnosis item. As a result, unnecessary materials and adjustment time can be reduced. However, according to the present invention, a range for image quality adjustment is not particularly limited.

A right chart C2 of FIG. 3 corresponds to a second chart in which a pattern is formed on a first side (SIDE 1) of the sheet in a duplex mode, no pattern is printed on the other side, and imaging and fixation are performed for the image data 0 to print a white image (white portion). Note that the white image is not printed using a white toner, but is obtained through fixation without using image data while no pattern is printed. Note that, in this example, an image noise diagnosis pattern is printed as a chart. The image noise may include a streak, banding, a dot, a stain, and the like. In this example, a pattern is printed to diagnose a vertical streak having a process color (YMCK). In the chart C2, since duplex printing is performed, SIDE 1 is positioned in the backside, and the image is read by the image reading part 24 (SCANNER 1). In addition, SIDE 2 is positioned in the front side, and the image is read by the image reading part 25 (SCANNER 2).

The chart C3 positioned in the center between the left and right sides of FIG. 3 corresponds to a third chart in which a pattern is formed on a second side (SIDE 2) of the sheet in a duplex mode, no pattern is printed on the other side, and imaging and fixation are performed for the image data 0 to print a white image (white portion). Note that the white image is not printed using a white toner, but is obtained through fixation without using image data while no pattern is printed. Note that, in this example, an image noise diagnosis pattern is printed as a chart. The image noise may include streaks, banding, dots, stain, and the like. In this example, the pattern is printed to diagnose a horizontal streak or an inclined streak having a process color (YMCK). In the chart C3, since duplex printing is performed, SIDE 1 is positioned in the backside, and the image is read by the image reading part 24 (SCANNER 1). In addition, SIDE 2 is positioned in the front side, and the image is read by the image reading part 25 (SCANNER 2).

In the diagnosis using the image noise diagnosis patterns printed in the charts C2 and C3, when it is determined that a detailed diagnosis is necessary, the process may advance to the detailed diagnosis in which a factor that generates an image noise specified as necessitating the detailed diagnosis is diagnosed in details.

Note that, in the detailed diagnosis, a process of reducing an image noise by adjusting a parameter of the imaging process or a process of reducing the image noise by performing an event relating to the imaging process, a process of narrowing the factor by comparing the images before and after the event, or the like may be performed.

The event may include idling of the intermediate transfer belt of the image forming part, cleaning of the charging electrode, refreshing of the surface of the photoreceptor, or a control of operating any adjustment mechanism in the imaging process of biased development.

In the chart C2 or C3, a white image is printed. If an image noise is found by comparing the read image of the white image and the read image of the white portion of the chart C1, a factor can be switched through the diagnosis of the diagnosis unit depending on whether or not the image noise is caused by the image forming part (imaging unit) or by the sheet conveyor regardless of imaging. For example, if there is no image noise in the white portion of the chart C1, and there is an image noise in the white image of the chart C2 or C3, it can be determined that the image noise is caused by the imaging unit. Meanwhile, if there are image noises in both the chart C1 and one of the charts C2 or C3, it can be determined that the image noise is caused by the sheet conveyor.

For example, for the chart C3, by printing a halftone image on a pattern of the second side and comparing it with the white image on the other side, it is possible to diagnose a white dot (whitening in the halftone image). Note that, since the white dot is influenced by a moisture content of a sheet, it is preferable that the diagnosis is performed using a sheet type in which the moisture content of the sheet is easily changed around the fixation, such as a plain sheet.

Typically, if the basic image diagnosis pattern is printed on the chart C1, the image diagnosis is performed depending on the basic image diagnosis item. If the image noise diagnosis pattern is printed on the chart C2 or C3, the image diagnosis is performed depending on the image noise diagnosis item. However, a part of the image noise diagnosis items may be diagnosed using a part of the basic image diagnosis pattern, or a part of the basic image diagnosis items may be diagnosed using a part of the image noise diagnosis pattern. For example, density unevenness as a part of the basic image item may be diagnosed using the read image of the image noise diagnosis pattern to determine whether or not adjustment is necessary, and fogging as an image noise item may be diagnosed using the read image of the basic image diagnosis pattern.

Note that, although the image is read using the first, second, and third charts in the example of FIG. 3, the third chart may not be used as long as at least the first and second charts are used according to the present invention. In addition, another chart may also be used in addition to the first, second, and third charts.

Figure 4:
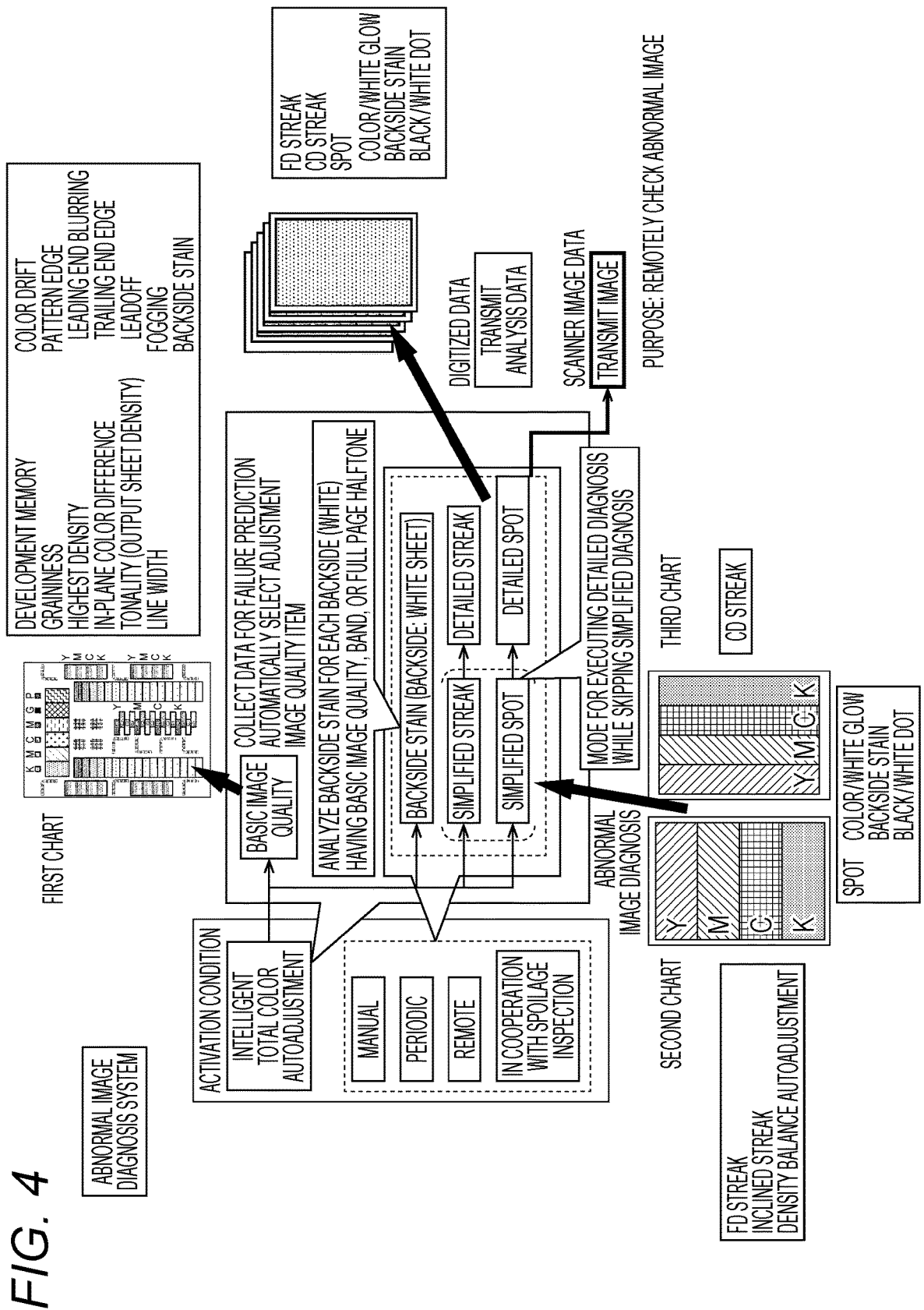
FIG. 4 is a diagram illustrating an outline of a configuration of an abnormal image diagnosis system according to an embodiment of the invention.

Next, a conceptual diagram of an image diagnosis system using the chart according to the present invention is illustrated in FIG. 4.

For the diagnosis, a first chart is prepared by printing a basic image diagnosis chart as illustrated in the upper half of FIG. 4. For the first chart, the image control unit prepares image data and forms an image on a sheet in the one-side mode. In the first chart, a development memory, graininess, a highest density, a color difference in a page, tonality (output sheet density), a line width, a color drift, a pattern edge, leading end blurring, a trailing end edge, a leadoff, fogging, a backside stain, and the like are set as the diagnosis items.

In the diagnosis, as illustrated in the lower half of FIG. 4, the second chart is prepared by printing an image noise diagnosis chart in a duplex mode. In the second chart, a feeding direction (FD) streak, an inclined streak, density balance autoadjustment, and the like are set as the diagnosis items.

In addition, in the diagnosis, the third chart is prepared by printing an image noise diagnosis chart in a duplex mode. In the third chart, a spot color/white glow, a backside stain, a black/white dot, and the like are set as the diagnosis items.

The diagnosis system can be activated manually, periodically, remotely, in cooperation with spoilage inspection, or the like. In addition, color autoadjustment can be performed intelligently at once. A condition for performing the autoadjustment may be appropriately set, and the autoadjustment may be performed manually or periodically.

When the adjustment is activated manually, periodically, or the like, it is possible to perform a backside stain diagnosis using a blanked backside, a simplified streak diagnosis, or a simplified spot diagnosis. In the backside stain diagnosis, the analysis can be performed for each backside (white) having the basic image quality, a band, or full page halftone.

In the streak analysis or spot analysis, a detailed diagnosis can be performed as necessary. If it is determined that the detailed diagnosis is necessary as a result of the simplified diagnosis, the diagnosis may be performed in a detailed streak or spot mode. In the detailed streak or spot mode, a detailed diagnosis may be executed by skipping the simplified diagnosis. Whether or not the detailed diagnosis is performed depending on the result of the simplified diagnosis is not limited to the streak diagnosis or the spot diagnosis. Furthermore, the detailed diagnosis may be performed by skipping the simplified streak diagnosis or the simplified spot diagnosis.

In such a diagnosis, an abnormal image may be remotely checked by transmitting the read image (scan image). In addition, in the detailed diagnosis, the analysis data is digitized and transmitted to adjust a FD streak, a CD streak, a spot, a color/white glow, backside stain, a black/white dot, or the like in more details In the intelligent total color autoadjustment, the basic image diagnosis chart for the first chart is printed and diagnosed in addition to the backside stain, the streak, the spot, or the like. In this diagnosis, data dedicated to failure prediction may be collected, or adjustment image quality items may be automatically selected.

In the diagnosis, the scan image data may be transmitted to the outside. For example, this image data may be used to remotely check an abnormal image or the like.

The diagnosis result may be transmitted as analysis data obtained by analyzing and digitizing each item such as FD streak, CD streak, spot, a color/white glow, a backside stain, and black/white dot. The analysis data can be used to determine whether or not the image quality adjustment is performed or select items subjected to the image quality adjustment, or can be used in device maintenance.

Figure 5:
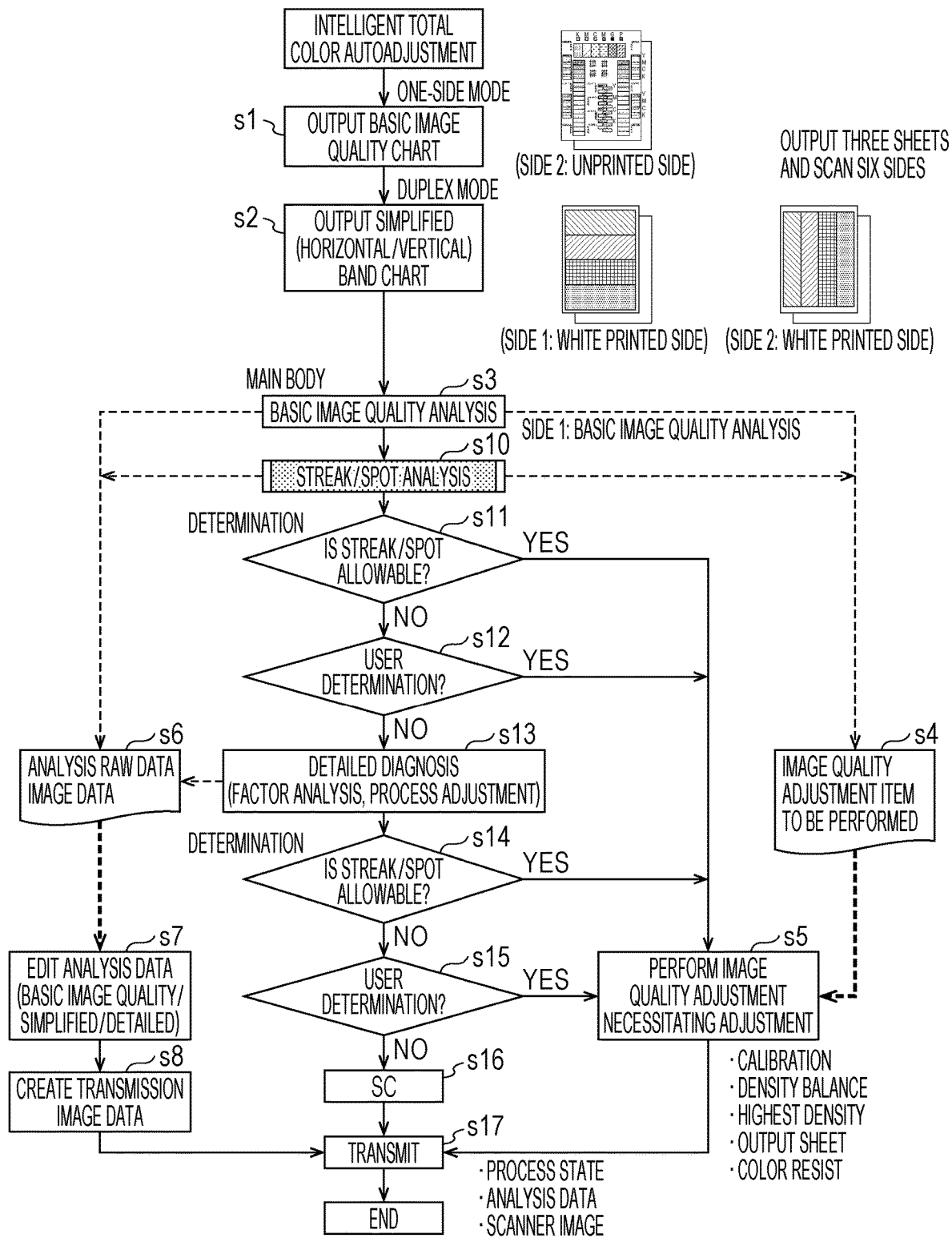
FIG. 5 is a flowchart illustrating an execution process of intelligent total color autoadjustment according to an embodiment of the invention.

Next, a process of the intelligent total color autoadjustment will be described with reference to the flowchart of FIG. 5. The following process is executed by controlling the diagnosis unit.

As the processing starts, a basic image quality chart on which a pattern is printed in a one-side mode is output to a sheet of the first chart (step s1). In this case, the chart is printed on SIDE 1 of the sheet, and no image is printed on its backside.

Then, white printing is performed on SIDE 1 of the sheet as a second chart in a duplex mode, and a simplified horizontal band chart is printed on SIDE 2 of the sheet. In addition, a simplified vertical band chart is printed on SIDE 1 of the sheet as a third chart in a duplex mode, and white print is performed on SIDE 2 of the sheet (step s2). Three sheets having six pages are output by printing the first, second, and third charts.

As the sheets are output, the sheets are read, and a result of the reading is acquired by the diagnosis unit.

The apparatus body analyzes the basic image on the basis of the read image (step s3), and an image quality adjustment item is set depending on a result of the analysis and is notified (step s4) to an image quality adjustment process (step s5) necessitating the adjustment.

In addition, in step s3, analysis raw data and image data are prepared (step s6).

After the basic image quality analysis (step s3), a simplified streak/spot analysis is performed (step s10). The image quality adjustment item to be adjusted is set depending on a result of the analysis (step s4). In addition, in the streak/spot analysis (step s10), analysis raw data and image data are prepared (step s6).

After the streak/spot analysis, it is determined whether or not a streak/spot is allowable (step s11). A determination criterion is defined in advance, and whether or not a streak/spot is allowable is determined on the basis of this criterion.

If the streak/spot is allowed (step s11: Yes) as a result of the determination, a result of the allowance is notified to the image quality adjustment process (step s5) necessitating adjustment.

If the streak/spot does not satisfy the criterion and is not allowed as a result of the determination (step s11, No), user determination is necessary (step s12). The user determination may be performed by querying the manipulation unit or the like. If the streak/spot is allowed as a result of user determination (step s12, Yes), a result of the allowance is notified to the image quality adjustment process (step s5) necessitating adjustment.

If the streak/spot is not allowed due to the user determination (step s12, No), a detailed diagnosis is performed for a streak/spot, a reason is analyzed, and process adjustment is performed (step s13). Note that, although descriptions of the simplified diagnosis and the detailed diagnosis are displayed by integrating the streak/spot in the diagram of this example, the simplified diagnosis, the detailed diagnosis, and the determination on allowance may be performed individually for each of the streak and the spot.

A result of the detailed diagnosis is transmitted to a process of preparing the analysis raw data and the image data of step s6.

On the basis of the analysis raw data or the image data prepared in step s6, analysis data regarding the basic image quality or the simplified/detailed diagnosis is edited (step s7), and the transmission image data is further created (step s8). Then, the process advances to a transmission process of step s17.

After the detailed diagnosis (step s13), it is determined whether or not the streak/spot is allowed on the basis of the diagnosis result (step s14). A criterion for the determination is set in advance, and a result of the determination on whether or not the streak/spot is allowed is obtained on the basis of this criterion.

If the streak/spot is allowed in the detailed diagnosis as a result of the determination (step s14, Yes), a result of the allowance is notified to the image quality adjustment process necessitating adjustment (step s5).

If the streak/spot is not allowed as a result of the determination (step s14, No), user determination is obtained (step s15). The user determination may be performed by querying the manipulation unit or the like. If the streak/spot is allowed as a result of the user determination (step s15, Yes), a result of the allowance is notified to the image quality adjustment process necessitating adjustment (step s5).

In step s5, the result that the streak/spot is allowed is received, and image quality adjustment necessitating adjustment is performed. For example, calibration, density balance, highest density, output sheet, and color rasterization are performed. After step s5, the process advances to a transmission process.

In the transmission process (step s17), a process state, analysis data, a scan image, or the like are transmitted, and the process is then terminated.

Meanwhile, if a streak/spot is not allowed as a result of the user determination (step s15, No), a serviceman call (SC) operation starts (step s16). The serviceman call may be displayed on the manipulation unit or the like to notify a user, or may be notified to a manager automatically via a network or the like. After the serviceman call, a transmission process is performed (step s17). Then, the process is terminated.

Figure 6:
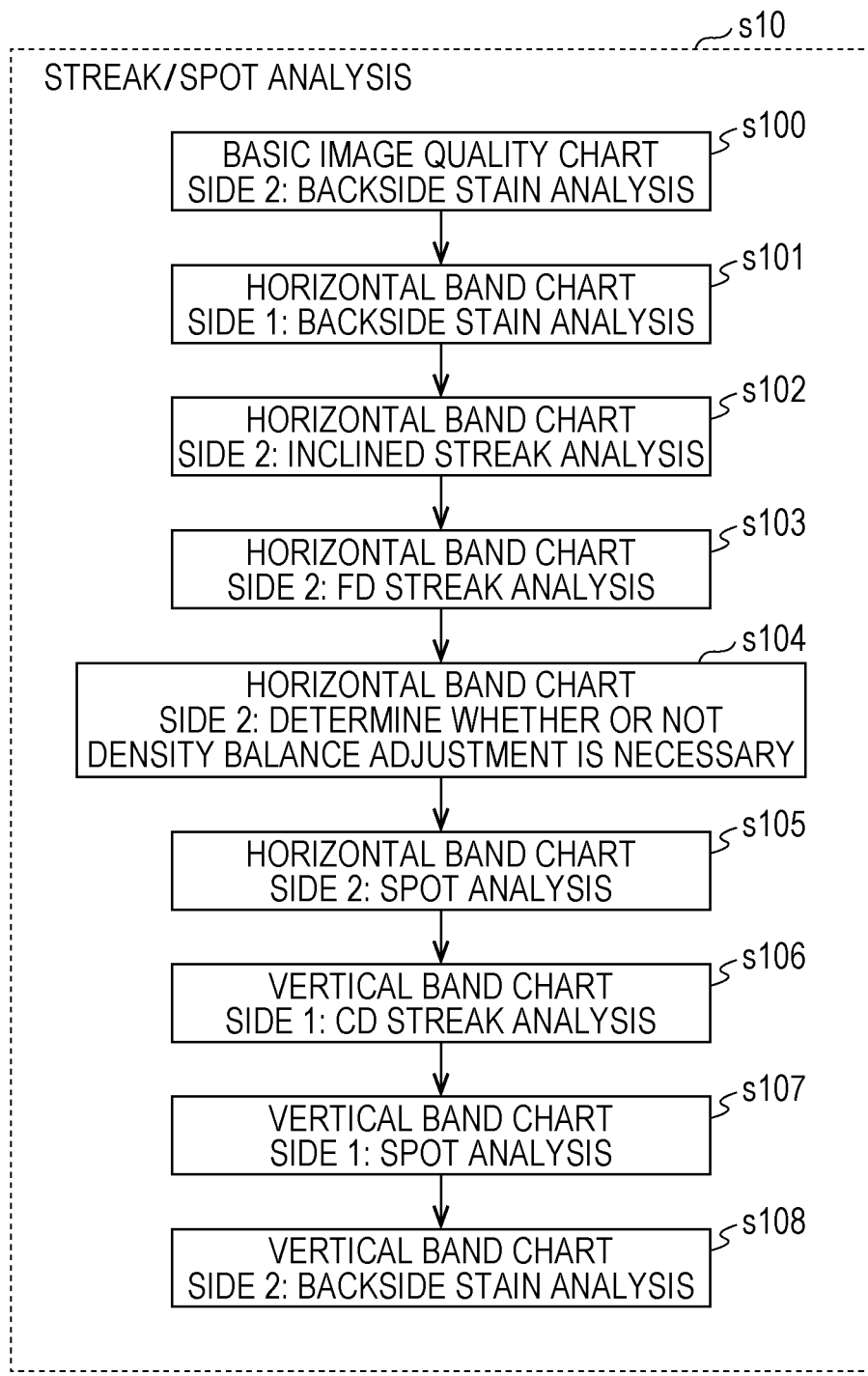
FIG. 6 is a flowchart illustrating a detailed process of a streak/spot analysis.

Next, the streak/spot analysis of step s10 will be described in details with reference to the flowchart of FIG. 6. The following process is executed by controlling the diagnosis unit. This similarly applies to the following description.

First, a backside stain of SIDE 2 is analyzed for the basic image quality chart (step s100), and a backside stain of SIDE 1 is analyzed for the horizontal band chart (step s101).

Then, for the horizontal band chart, an inclined streak analysis for SIDE 2 (step s102), an FD streak analysis for SIDE 2 (step s103), determination on whether or not density balance adjustment is necessary in SIDE 2 (step s104), and a spot analysis of SIDE 2 (step s105) are performed. In addition, in the vertical band chart, a CD streak analysis for SIDE 1 (step s106), a spot analysis for SIDE 1 (step s107), a backside stain analysis for SIDE 2 (step s108), and a streak/spot analysis are performed.

Figure 7:
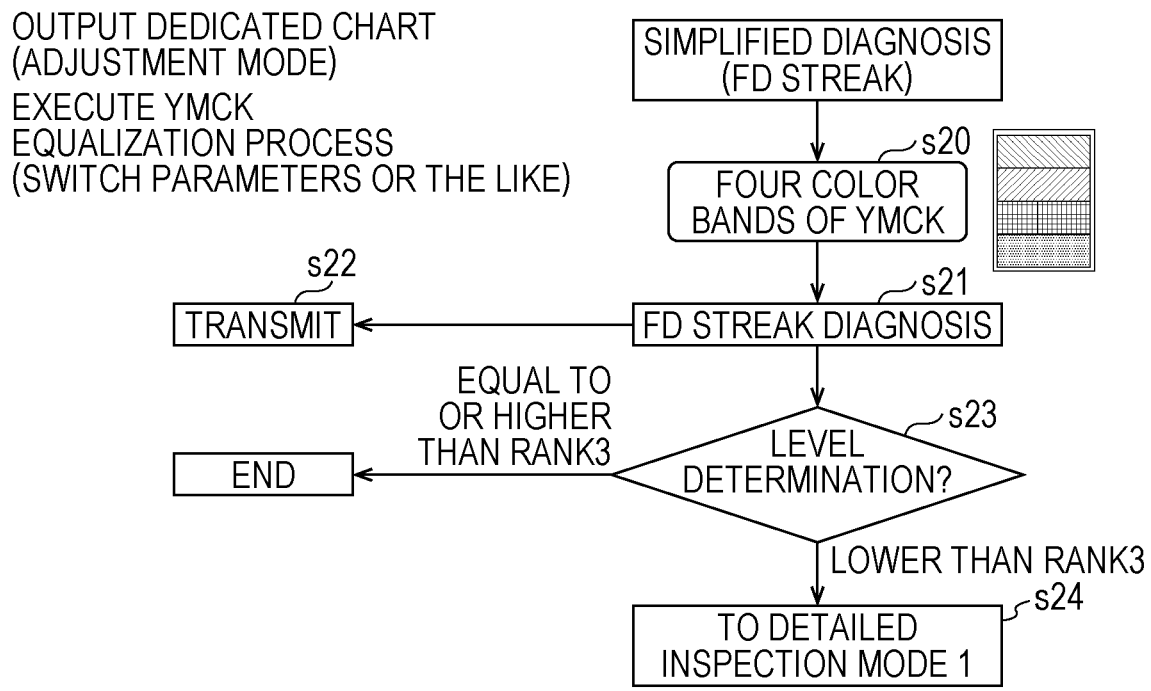
FIG. 7 is a flowchart illustrating a simplified diagnosis process for an FD streak according to an embodiment of the invention.

Next, a simplified diagnosis process for an FD streak will be described with reference to the flowchart of FIG. 7. The process is executed by controlling the diagnosis unit.

As described above, a streak is printed on a dedicated chart and is output in an adjustment mode. A YMCK equalization processing is performed, and parameters or the like are converted.

When the chart is printed, four color bands (YMCK) are printed (step s20), and the FD streak diagnosis is performed (step s21). A result of the diagnosis is transmitted (step s22). After the diagnosis, level determination is performed (step s23). Here, a rank is set as a criterion. If the rank is equal to or higher than RANK3, it is considered that there is no problem, and the simplified diagnosis is terminated. If the level is lower than RANK3, the process advances to Detailed Inspection Mode 1 (step s24). Note that the criterion of the rank may be set appropriately and is not limited to the particular one of the present invention. A different criterion may be set depending on a difference of a user, a quality criterion, and the like.

Figure 8:
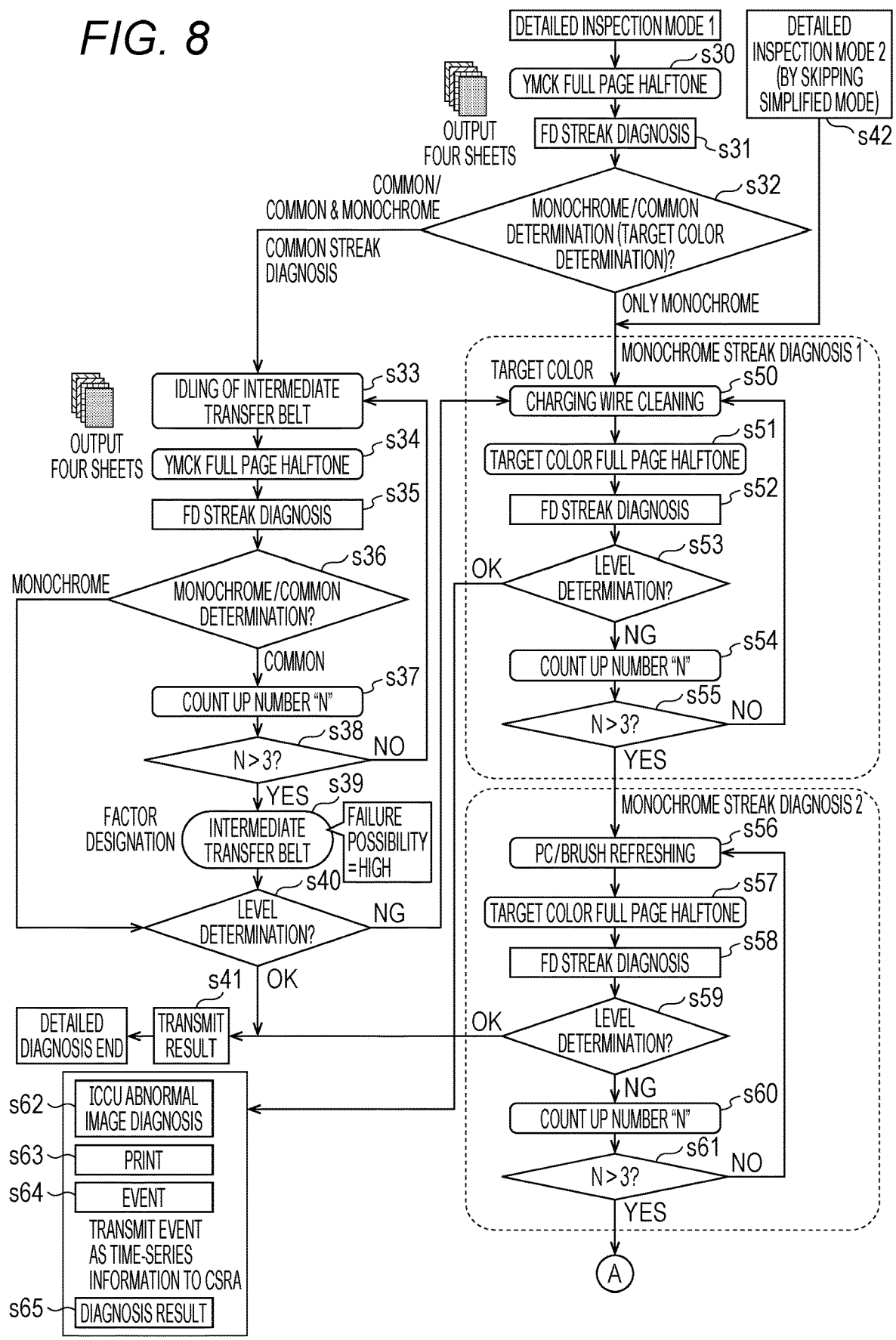
FIG. 8 is a flowchart illustrating an execution process of a detailed inspection mode according to an embodiment of the invention.

Next, a process of Detailed Inspection Mode 1 will be described with reference to the flowchart of FIG. 8. The following process is executed by controlling the diagnosis unit.

In Detailed Inspection Mode 1, a full page halftone is printed on four charts for each color of YMCK (step s30). An FD streak diagnosis is performed for this chart (step s31). Then, the determination is performed in a common mode or in a common and monochrome mode, or the determination is performed only in a monochrome mode (step s32). The setting may be performed in advance.

When the common mode streak diagnosis is performed (step s32, common mode streak diagnosis), idling of the intermediate transfer belt is performed (step s33), and four charts of YMCK full page halftone are output (step s34). The FD streak diagnosis is performed by reading the charts (step s35), and determination on whether it is monochrome or common is performed (step s36). In the case of the monochrome (step s36, monochrome), level determination is performed (step s40). The level is set in advance.

If the common mode is determined (step s36, common), the number "N" is counted up for each color (step s37), and it is determined whether or not the number "N" is greater than "3" (step s38). If the number "N" is not greater than "3", the process returns to step s33, and the aforementioned process is repeated. If the number "N" is greater than "3" (step s38, N>3: Yes), the intermediate transfer belt is set by designating a factor (step s39), and the level determination is performed (step s40).

If no good (NG) is determined in the level determination of step s40, charging wire cleaning is performed in Monochromatic Streak Determination 1 (step s50).

If OK is determined in the level determination of step s40, the result is transmitted (step s41), and the detailed diagnosis is then terminated.

If only the monochrome is determined in the monochrome/common mode determination in step s32, or in Detailed Inspection Mode 2 in which a detailed inspection is performed by skipping the simplification mode, charging wire cleaning is performed for a target color in the monochrome streak diagnosis (step s50).

Then, the target color is printed on the chart in a full page halftone, and the FD streak diagnosis is performed on the basis of a reading result of the chart (step s52). In addition, level determination is performed on the basis of a predetermined criterion (step s53). If OK is determined in the level determination (step s53, OK), the abnormal image diagnosis of the image reading part (ICCU) is performed (step s62). In addition, printing on a sheet (step s63), an event of transmitting time-series name information CSRA (step s64), and acquirement of the diagnosis result (step s65) are performed.

If NG is determined in the level determination of step s53, the number "N" is counted up (step s54), and it is determined whether or not the number "N" is greater than "3" (step s55). If the number "N" is not greater than "3" (step s55, N>3: No), the process returns to step s50, and the process is repeated. If "N>3" in step s55, "PC/brush refreshing" is performed in Monochrome streak diagnosis 2 (step s56). Then, a target color is printed on a sheet in a full page halftone (step s57), and the FD streak diagnosis is performed by reading this image (step s58). For the diagnosis result, level determination is performed on the basis of a predetermined criterion (step s59). If the level determination is "OK", the streak diagnosis is completed, and the result is transmitted in step s41.

If the level determination is "NG" in step s59, the number "N" is counted up (step s60), and it is determined whether or not the number "N" is greater than "3" (step s61). If the number "N" is not greater than "3", the process returns to step s56, and the aforementioned process is repeated. If the number "N" is greater than "3" (step s60, N>3: Yes), the process advances to the process of "A" of FIG. 9.

Figure 9:
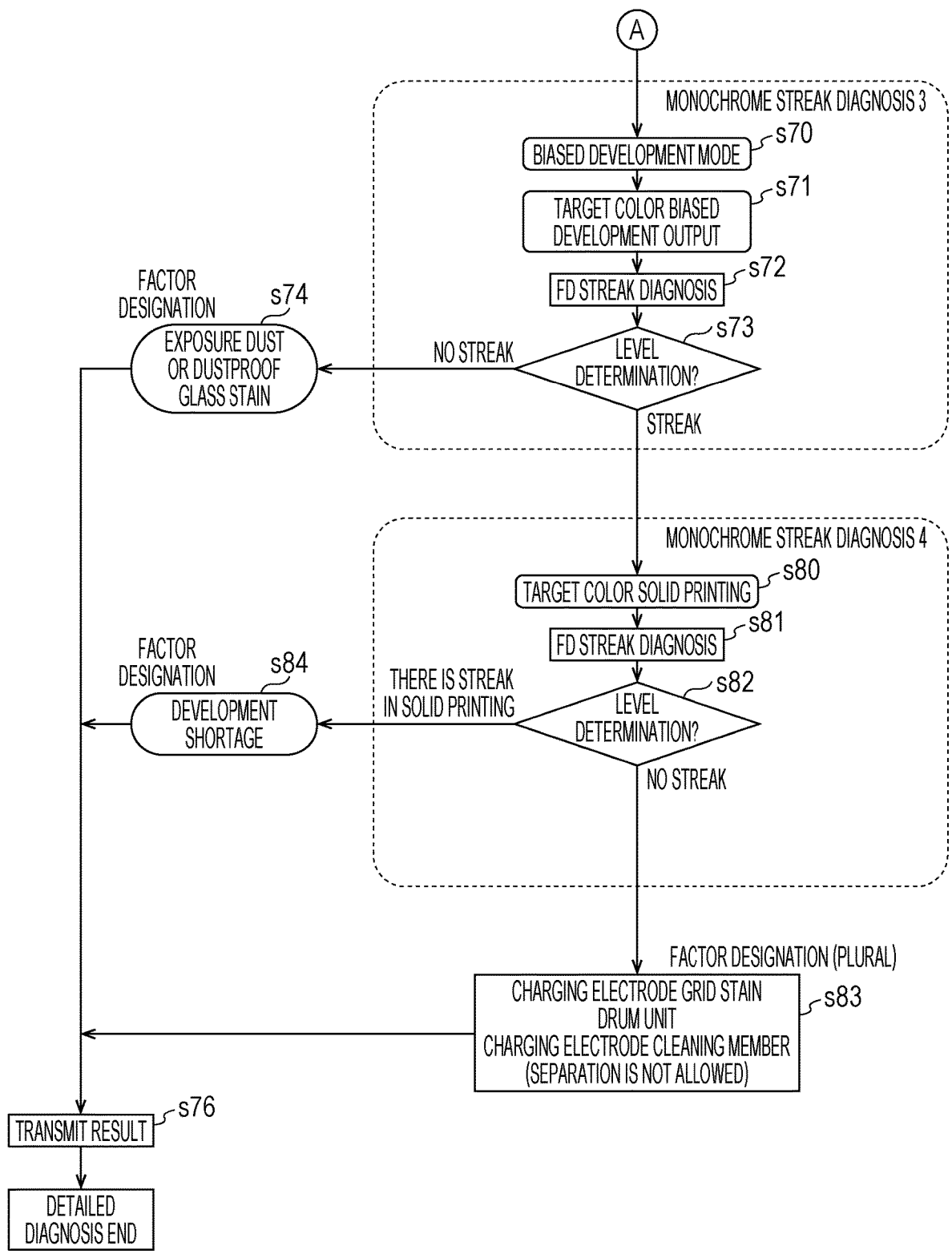
FIG. 9 is a flowchart illustrating an execution process of a detailed inspection mode according to an embodiment of the invention.

In processes subsequent to the process "A" of FIG. 9, Monochrome Streak Diagnosis 3 is performed, and a biased development mode is set (step s70). Then, a biased development output is performed for a target color (step s71), and an image on the output sheet is read to perform the FD streak diagnosis (step s72).

For the diagnosis result, level determination regarding existence of a streak is performed on the basis of a predetermined criterion (step s73). If it is determined that there is no streak (step s73, no streak), exposure dust caused by a stain or the like on dustproof glass is specified as factor designation (step s74). Then, the result is transmitted (step s76), and the detailed diagnosis is terminated.

If it is determined that there is a streak in the level determination in step s73 (step s73, streak), solid printing is performed for a target color as an item of Monochrome Streak Diagnosis 4 (step s80), and the output sheet is read to perform the FD streak diagnosis (step s81). For the diagnosis result, existence of an FD streak is determined on the basis of a predetermined criterion (step s82). If there is a streak in the sheet of the solid printing, development shortage is specified as factor designation (step s84). Then, the result is transmitted (step s76), and the detailed diagnosis is terminated.

If it is determined that there is no streak in the level determination of step s82, a plurality of factors are specified (step s83). A plurality of factors may be conceived. For example, the factors may include a charging electrode grid stain, a drum unit, a charging electrode cleaning member, and the like. However, separation is not allowed. After the factor designation, the result is transmitted (step s76), and the detailed diagnosis is terminated.

Next, a spot analysis process will be described. The spot analysis is performed using a simplified horizontal/vertical band chart.

Figure 10:
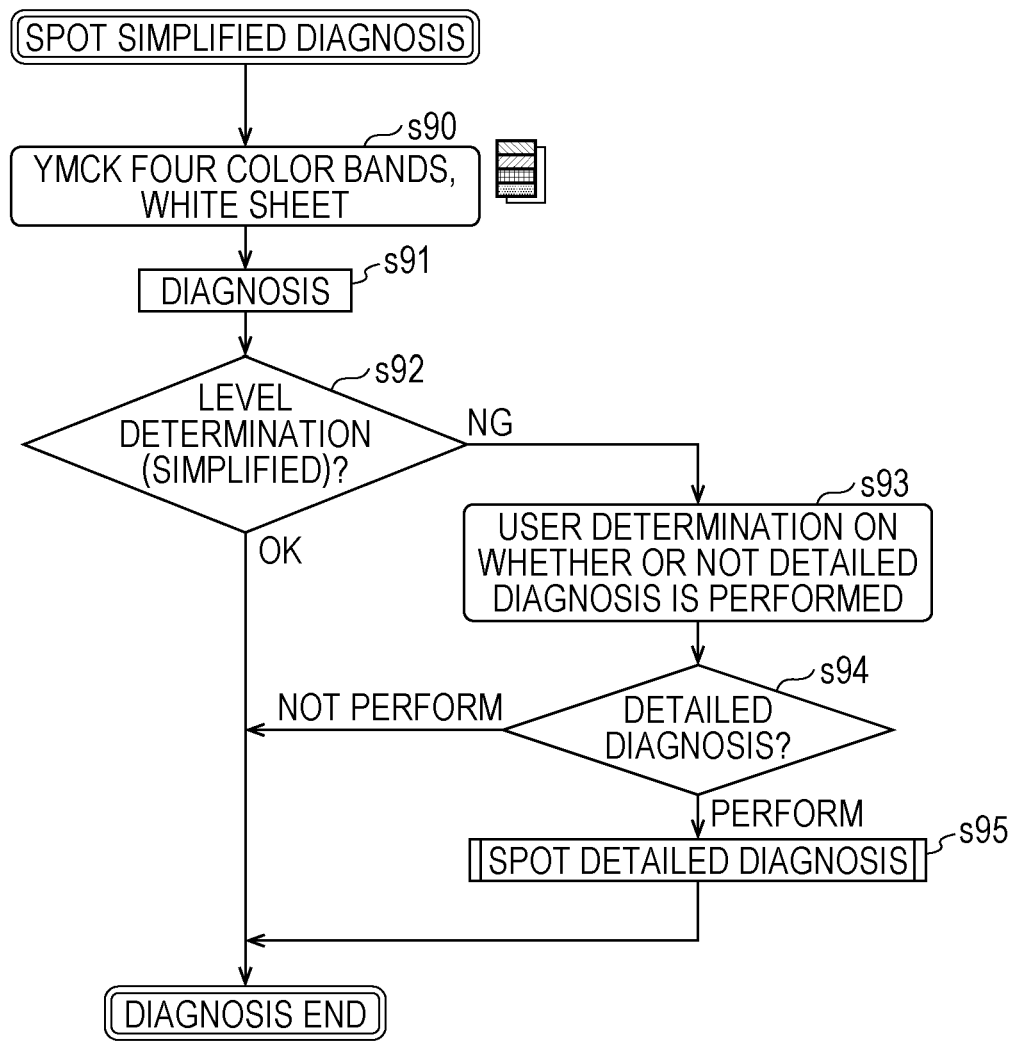
FIG. 10 is a flowchart illustrating a process of a simplified spot diagnosis according to an embodiment of the invention.

First, a simplified spot diagnosis will be described with reference to the flowchart of FIG. 10.

A chart is prepared by printing four color bands of YMCK on one side and printing white on the other side (step s90), and the diagnosis is performed by reading the image (step s91). For a result of the diagnosis, a simplified level analysis is performed on the basis of a predetermined criterion (step s92).

If the level analysis is "OK", the diagnosis is terminated. If the level analysis is "NG", this is displayed on the manipulation unit or the like in order to allow a user to determine the detailed diagnosis (step s93). If a user select "Not perform" (step s94, No), the diagnosis is terminated.

It "Perform" is selected for the detailed diagnosis (step s94, Yes), the spot detailed diagnosis is performed (step s95), and the diagnosis is then terminated.

Figure 11:
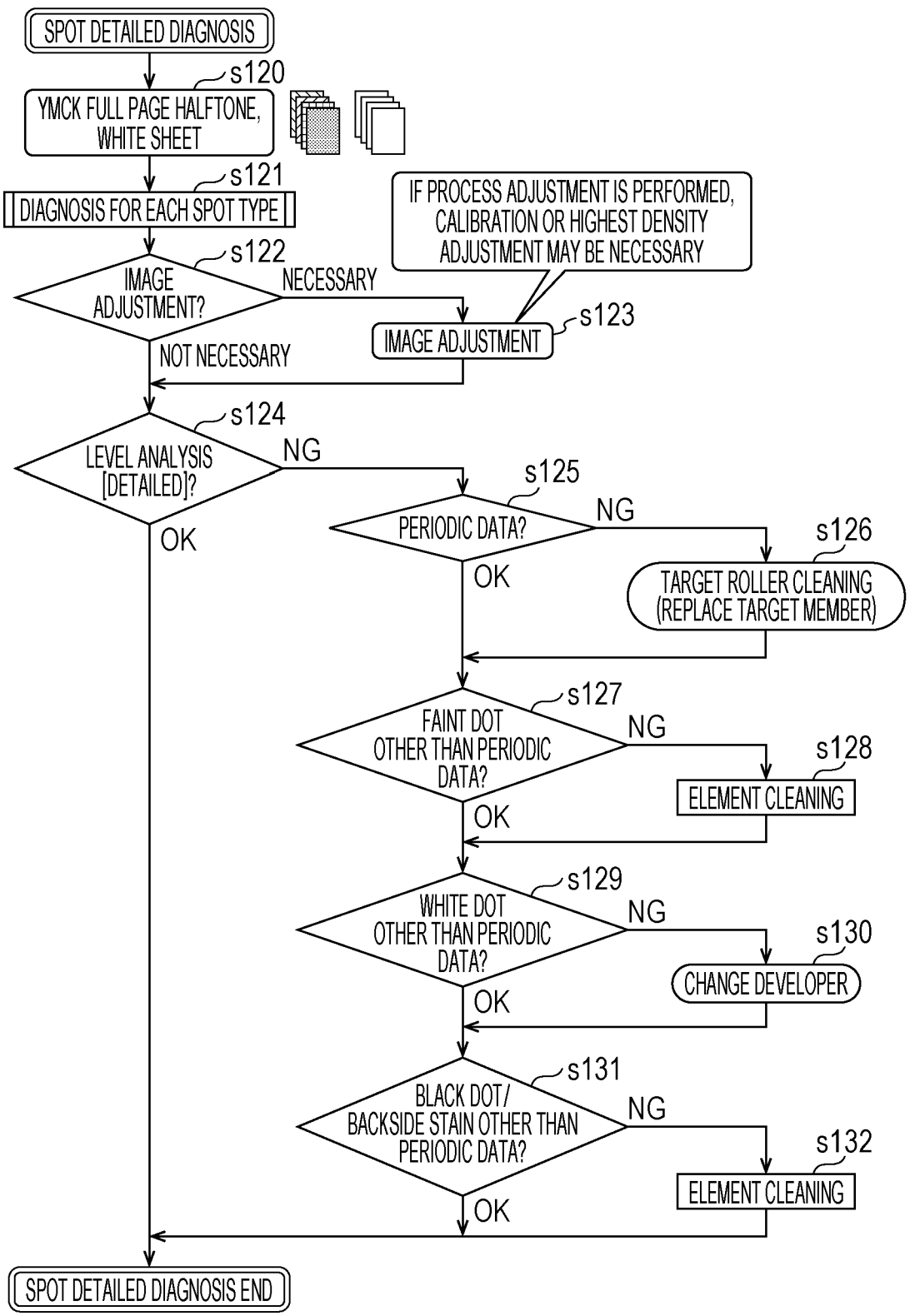
FIG. 11 is a flowchart illustrating an execution process of a detailed spot diagnosis according to an embodiment of the invention.

Next, the aforementioned detailed spot diagnosis will be described with reference to the flowchart of FIG. 11.

First, a full page halftone is printed for each color of YMCK on one side, and white is printed on the other side (step s120).

Then, the diagnosis is performed for each spot type (step s121). This will be described below in more details.

After the diagnosis, it is determined whether or not image adjustment is necessary (step s122).

If the image adjustment is necessary (step s122, Necessary), the image adjustment is performed (step s123). As the process adjustment is performed, calibration of highest density adjustment may be necessary.

If the image adjustment is not necessary in step s122 (step s122, No), or after the image adjustment of step s123, a level analysis is performed for the detailed diagnosis on the basis of a predetermined criterion (step s124).

If the level analysis is "OK" in step s124, the detailed spot diagnosis is terminated.

If "NG" is determined in the level analysis of step s124, it is determined whether or not periodic data is "OK". If the periodic data is "NG" (step s125, NG), cleaning of a target roller or replacement of a replaceable member is performed.

If the periodic data is determined as "OK" in step s125 (step s125, OK), or after the cleaning of the target roller or the like in step s126, it is determined whether or not a faint dot other than the period data is "OK" (step s127).

The faint dot other than the periodic data is "NG" (step s127, NG), element cleaning is performed (step s128).

If the faint dot other than the periodic data is "OK" (step s127, OK), or after the element cleaning of step s128, it is determined whether or not a white dot other than the periodic data is "OK" (step s129). If the white dot other than the periodic data is "NG" (step s129, NG), the developer is changed (step s130).

If the white dot other than the periodic data is "OK" in step s129 (step s129, OK), or after the developer is changed in step s130, it is determined whether or not a black dot/backside stain other than the periodic data is "OK" (step s131). If it is determined that the black dot/backside stain other than the periodic data is "NG" (step s131, NG), element cleaning is performed (step s132).

If the black dot/backside stain other than the periodic data is "OK" (step s131, OK), or after the element cleaning of step s132, the detailed spot diagnosis is terminated.

Figure 12:
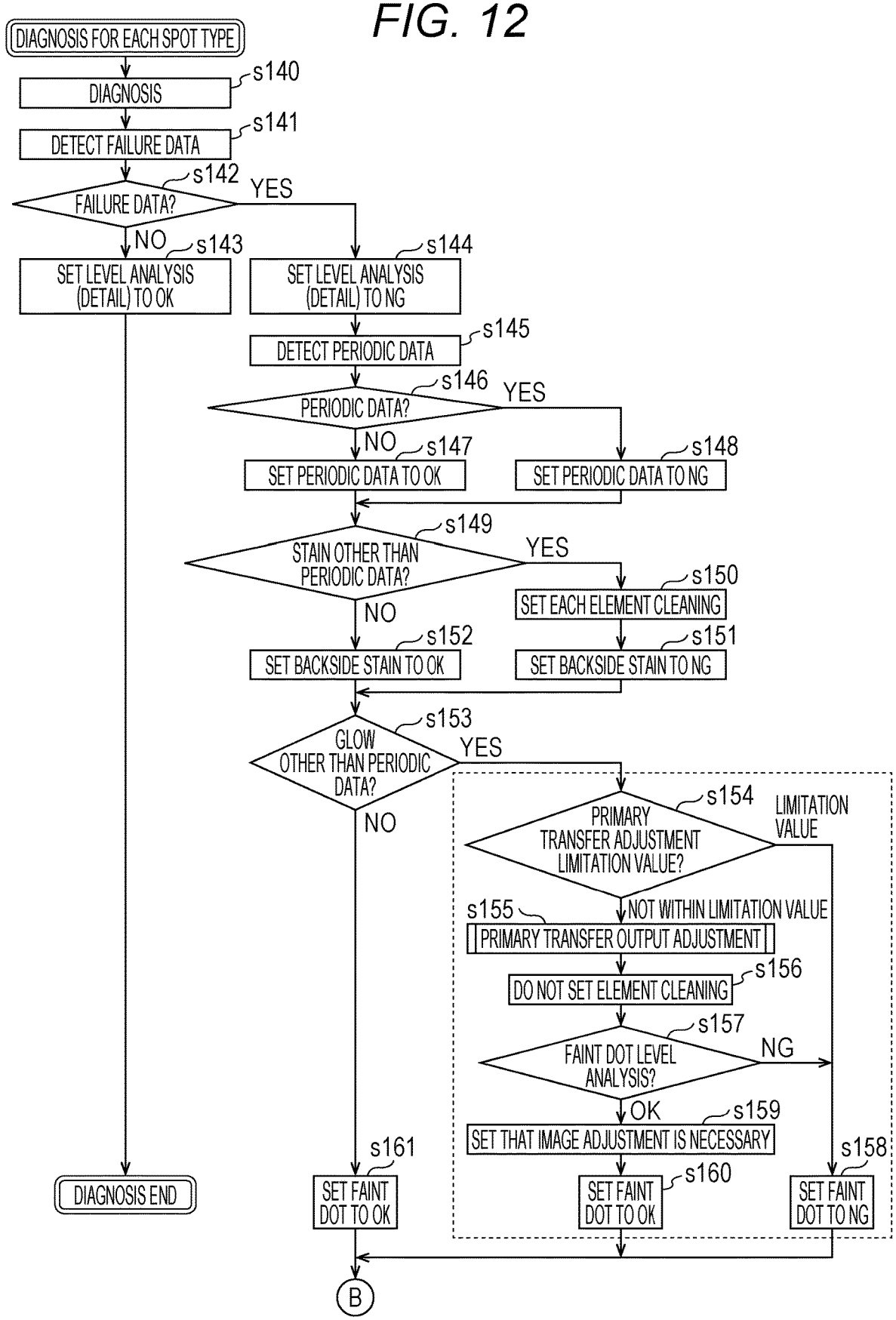
FIG. 12 is a flowchart illustrating details of a diagnosis process for each spot type according to an embodiment of the invention.

Next, a diagnosis process for each spot type will be described in details with reference to the flowchart of FIG. 12.

The diagnosis is performed for each spot type (step s140), and failure data is detected (step s141) to determine whether or not there is failure data (step s142).

If there is no failure data (step s142, No), the level analysis (detailed) is set to "OK" (step s143), and the diagnosis is terminated.

If there is failure data (step s142, Yes), the level analysis (detailed) is set to "NG" (step s144). Then, the periodic data is detected (step s145), and it is determined whether or not there is periodic data (step s146). If there is no periodic data (step s146, No), the periodic data is set to "OK" (step s147). If there is periodic data (step s146, Yes), the periodic data is set to "NG" (step s148).

It is determined whether or not there is a stain other than the periodic data after step s147 or s148 (step s149).

If a stain other than the periodic data does not exist (step s149, No), the backside stain is set to "OK" (step s152). If there is a stain other than the periodic data (step s149), cleaning settings for each element are performed (step s150), and the backside stain is set to "NG" (step s151).

After step s152 or s151, it is determined whether or not there is a glow other than the periodic data (step s153).

If there is no glow other than the periodic data (step s153, No), the faint dot is set to "OK" (step s161), and the process advances to the process B of the next drawing.

If there is a glow other than the periodic data (step s153, Yes), it is determined whether or not it is within a primary transfer adjustment limitation value (step s154).

If the glow is within the primary transfer adjustment limitation value (step s154, limitation value), the faint dot is set to "NG" (step s158), and the process advances to process "B".

If the glow is not within the primary transfer adjustment limitation value (step s154, not limitation value), primary transfer output adjustment is performed (step s155), and the element cleaning is not set (step s156).

Then, a faint dot level analysis is performed (step s157). If the faint dot level analysis is "OK" (step s157, OK), it is set that the image adjustment is necessary (step s159), and the faint dot is set to "OK". Then, the process advances to process "B". If the faint dot level analysis is "NG" (step s157, NG), the faint dot is set to "NG" (step s158), and the process advances to process "B".

Figure 13:
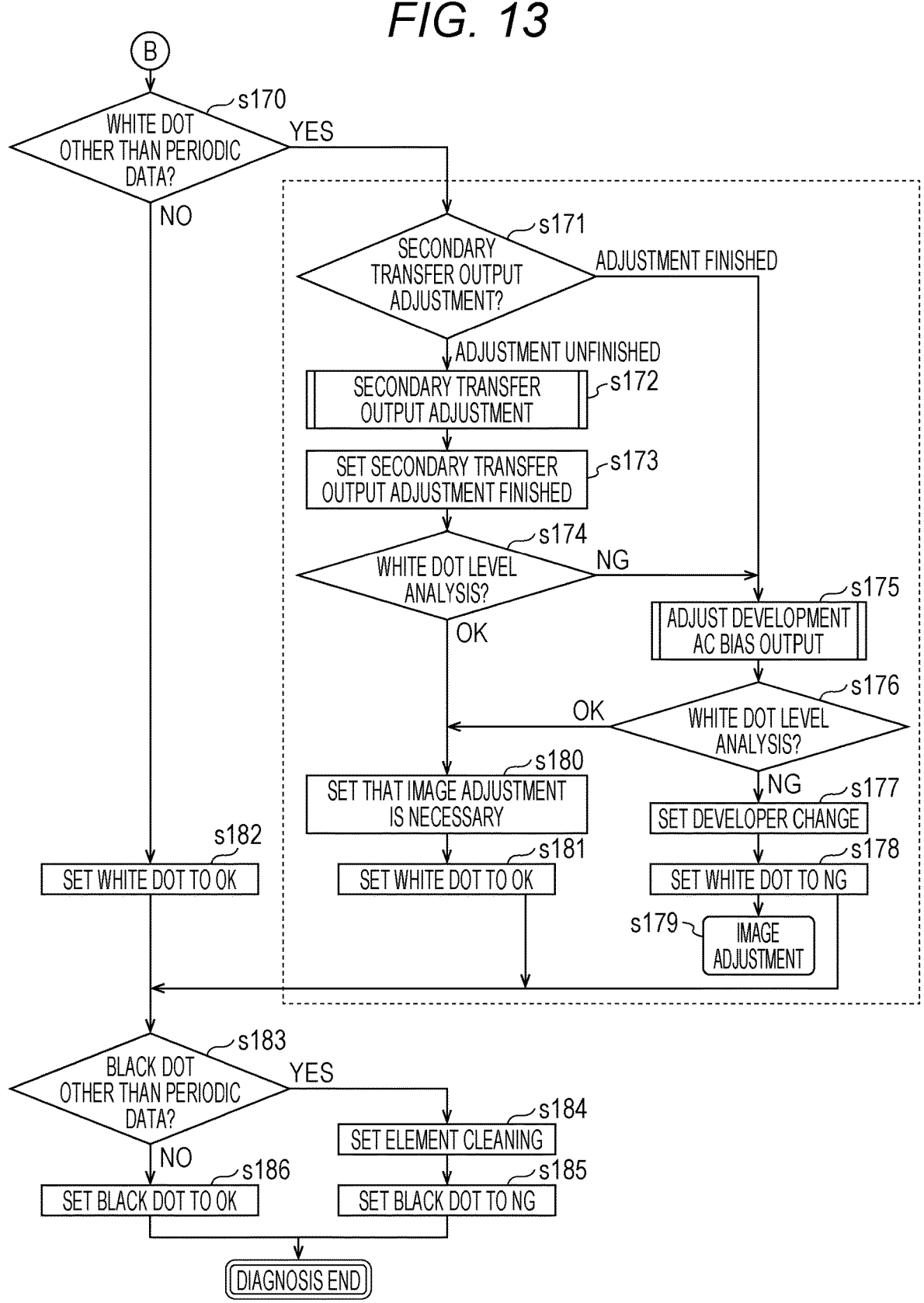
FIG. 13 is a flowchart illustrating details of a diagnosis process for each spot type according to an embodiment of the invention.

Next, the aforementioned process "B" will be described with reference to the flowchart of FIG. 13.

First, it is determined whether or not there is a white dot other than the periodic data (step s170). If there is no white dot other than the periodic data (step s170, No), the white dot is set to "OK" (step s182). Then, it is determined whether or not there is a black dot other than the periodic data (step s183). If there is no black dot other than the periodic data (step s183, No), the black dot is set to "OK" (step s186), and the diagnosis is terminated. If there is a black dot other than the periodic data (step s183, Yes), the element cleaning is set (step s184), the black dot is set to "NG" (step s185), and the diagnosis is terminated.

In step s170, if there is a white dot other than the periodic data (step s170, Yes), it is determined whether or not secondary transfer output adjustment was performed (step s171).

If the secondary transfer output adjustment was not performed (step s171, No), the secondary transfer output adjustment is performed (step s172), and "secondary transfer output adjustment finished" is set (step s173).

Then, a white dot level analysis is performed (step s174). If the white dot level analysis is "OK" (step s174, OK), "image adjustment necessary" is set (step s180), and the white dot is set to "OK" (step s181). Then, the process advances to step s183 to determine whether or not there is a black dot other than the periodic data.

If the secondary transfer output adjustment is finished in step s171 (step s171, adjustment finished), or if the white dot level is "NG" in step s174, development AC bias output adjustment is performed (step s175), and a white dot level analysis is performed (step s176). If the white dot level analysis is "OK", the process advances to step s180, and the "image adjustment necessary" is set.

If the white dot level analysis is "NG" (step s176, NG), the developer change setting is performed (step s177), the white dot is set to "NG" (step s178), and the image adjustment is performed (step s179). Then, the process advances to step s183, and it is determined whether or not there is a black dot other than the periodic data.

Figure 14:
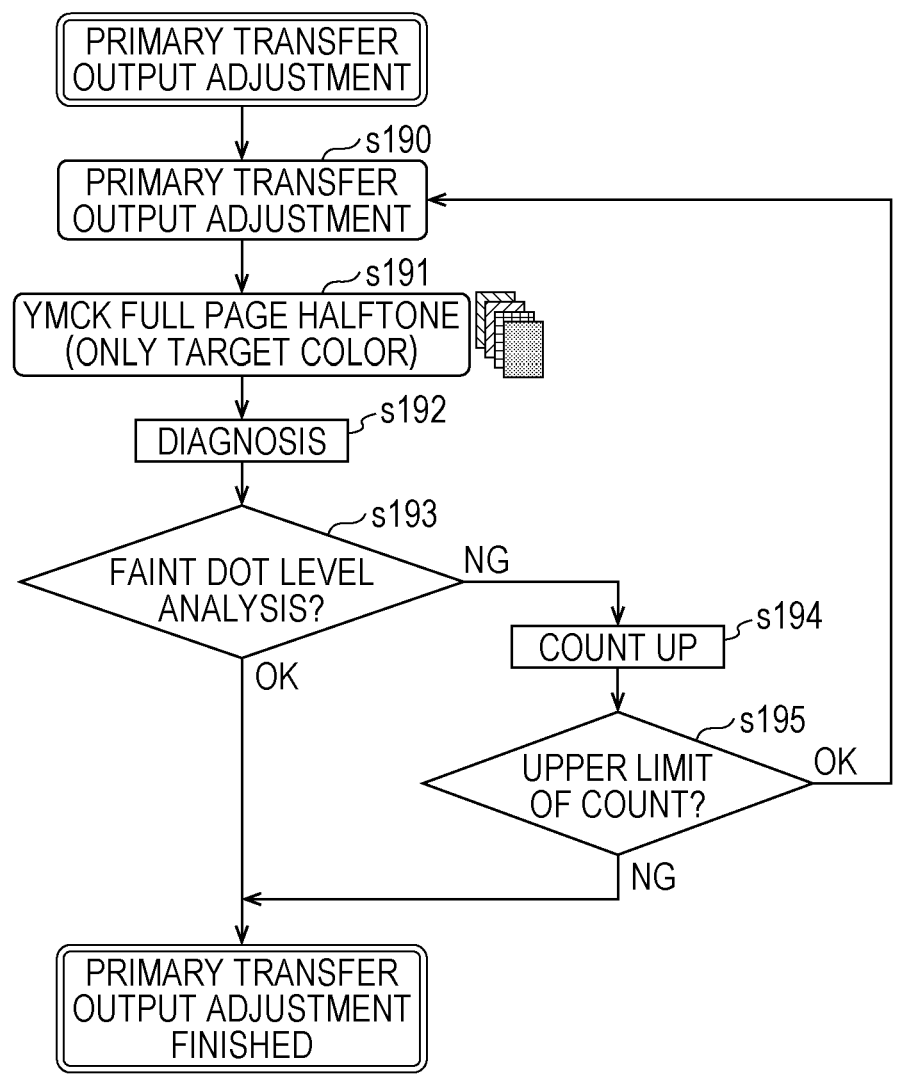
FIG. 14 is a flowchart illustrating a process of primary transfer output adjustment according to an embodiment of the invention.

Next, the primary transfer output adjustment process will be described in details with reference to the flowchart of FIG. 14.

First, the primary transfer output adjustment is performed (step s190), the full page halftone of YMCK is printed on a sheet. If there is only a target color, only the target color is printed. Image reading for the sheet is performed, and the diagnosis is performed (step s192). In addition, a faint dot level analysis is performed (step s193). If "OK" is determined on the basis of a predetermined criterion (step s193, OK), the primary transfer output adjustment is terminated.

If "NG" is determined in the faint dot level analysis (step s193, NG), the number is counted up (step s194), and it is determined whether or not the number reaches an upper limitation of the count (step s195). The upper limitation of the count is determined in advance. If the number does not reaches the upper limitation of the count (step s195, OK), the process advances to step s190, and the processes subsequent to the primary transfer output adjustment are repeated. If the number reaches the upper limitation of the count, and "NG" is determined (step s195, NG), the primary transfer output adjustment is terminated.

Figure 15:
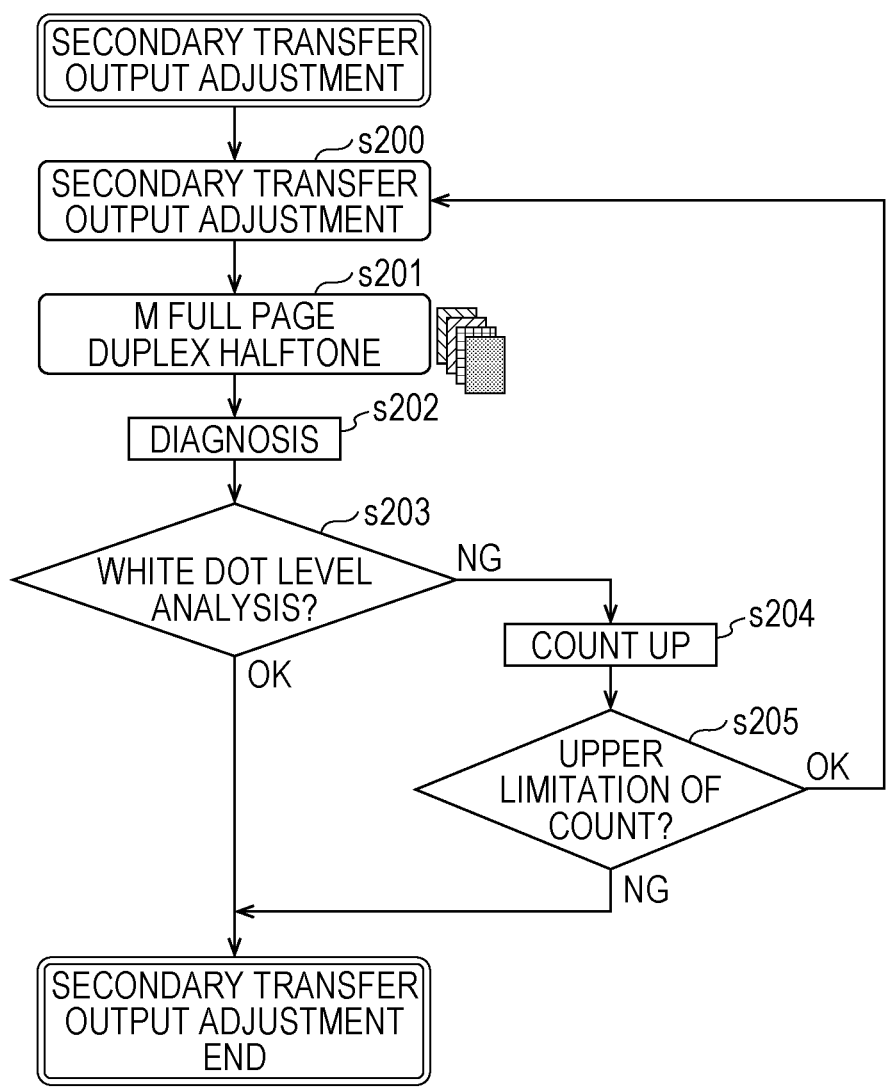
FIG. 15 is a flowchart illustrating an execution process of secondary transfer output adjustment according to an embodiment of the invention.

Next, the secondary transfer output adjustment process will be described with reference to the flowchart of FIG. 15.

First, the secondary transfer output adjustment is performed (step s200). Then, printing is performed in the M full page duplex halftone (step s201). The image on the printed matter is read, and the diagnosis is performed (step s202). In addition, the white dot level analysis is performed. If the level analysis is determined as "OK" on the basis of a predetermined criterion (step s203, OK), the secondary transfer output adjustment is terminated.

If the white dot level analysis is determined as "NG" (step s203, NG), the number is counted up (step s204), and it is determined whether or not the number reaches the upper limitation of the count (step s205). The upper limitation of the count is determined in advance. If the number does not reach the upper limitation of the count (step s205, OK), the process advances to step s200, and the processes subsequent to the secondary transfer output adjustment are repeated. If the number reaches the upper limitation of the count, and "NG" is determined (step s205, NG), the secondary transfer output adjustment is terminated.

Figure 16:
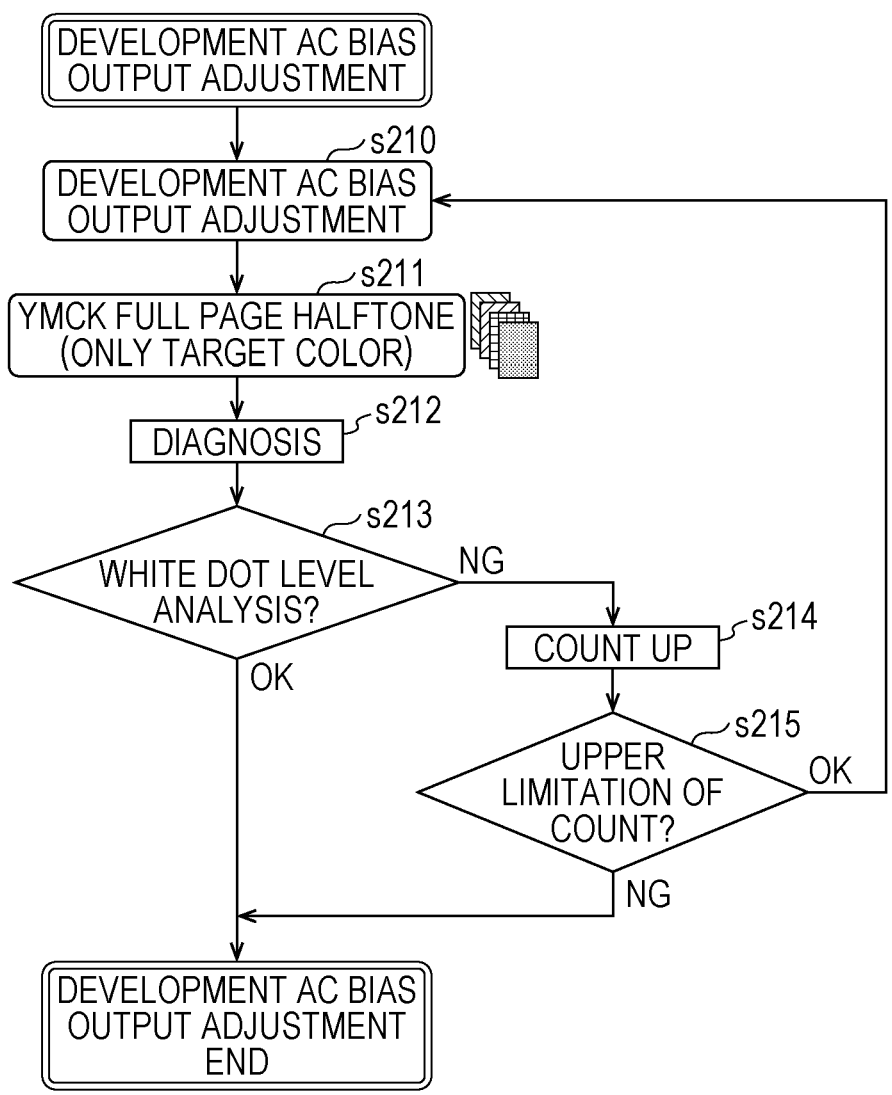
FIG. 16 is a flowchart illustrating an execution process of development AC bias output adjustment according to an embodiment of the invention.

Next, a process of the development AC bias output adjustment will be described with reference to the flowchart of FIG. 16.

First, the development AC bias output adjustment is performed (step s210) to perform printing in the YMCK full page halftone (step s211). In the case of only the target color, printing is performed only for the target color.

The image on the printed matter is read, and the diagnosis is performed (step s212). In addition, a white dot level analysis is performed (step s213). If the analysis is determined as "OK" on the basis of a predetermined criterion (step s213, OK), the development AC bias output adjustment is terminated.

If the white dot level analysis is determined as "NG" (step s213, NG), the number is counted up (step s214), and it is determined whether or not the number reaches the upper limitation of the count (step s215). The upper limitation of the count is determined in advance. If the number does not reach the upper limitation of the count (step s215, OK), the process advances to step s210, and the processes subsequent to the development AC bias output adjustment are repeated. If the number reaches the upper limitation of the count, and the analysis is determined as "NG" (step s215, NG), the development AC bias output adjustment is terminated.

According to an embodiment of the invention, it is possible to diagnose an image while saving materials or time in an image diagnosis and perform the image diagnosis with high accuracy.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image inspection apparatus comprising a hardware processor that performs an image diagnosis on the basis of reading images printed on a plurality of sheets of recording medium,
   wherein the hardware processor is configured to:
   acquire read images obtained by reading at least a first chart and a second chart printed on the plurality of sheets of recording medium,
   the first chart having a pattern that is printed only on a first side of a first sheet of the plurality of sheets of the recording medium in a one-side mode, and a second side of the first sheet is not subjected to a printing operation, thus leaving the second side of the first sheet blank,
   the second chart having a pattern that is printed on a first side of a second of the plurality of sheets of the recording medium, and a second side of the second sheet of the plurality of sheets of the recording medium is printed to provide a white image in a duplex mode; and
   perform a diagnosis by determining a side to be used in the diagnosis depending on an image diagnosis item.

2. The image inspection apparatus according to claim 1, wherein the white image is formed by printing no pattern during an imaging process.

3. The image inspection apparatus according to claim 1, wherein the hardware processor determines whether or not image adjustment as the diagnosis is necessary.

4. The image inspection apparatus according to claim 1,
   wherein the hardware processor is further configured to perform an image diagnosis for the read images on at least two sides including an unprinted side of the first sheet and a white image print side of the second sheet, and
   in the diagnosis, factors of a stain generated in a white portion of the unprinted side in the one-side mode or a white portion of the white image print side in the duplex mode are divided depending on whether or not the stain is caused from an image creation part or whether or not the stain is caused by a sheet conveyor regardless of creation of the image.

5. The image inspection apparatus according to claim 1,
   wherein the first chart is formed by printing a basic image quality diagnosis pattern for diagnosing a basic image quality on the first side, and
   the second chart is formed by printing an image noise diagnosis pattern for diagnosing an image noise on a pattern printed side.

6. The image inspection apparatus according to claim 5, wherein the basic image quality includes one or more factors out of a grayscale as a page image quality, a highest density, an edge quality of a patch portion, a development memory, graininess, a line width as a line image quality, or a color drift.

7. The image inspection apparatus according to claim 5, wherein the image noise includes one or more factors out of a streak, banding, a dot, or a stain.

8. The image inspection apparatus according to claim 5,
   wherein the second chart is formed by printing a first image noise diagnosis pattern on the first side and printing a white image on the second side, and
   the hardware processor is further configured to:
   acquire a read image obtained by reading an image on a third sheet of recording medium different from the recording medium to which the first and second charts are output, the third sheet of recording medium having a first side on which a white image is printed and a second side on which a second image noise diagnosis pattern is printed to output a third chart; and perform the diagnosis for at least two sides, including the unprinted side of the first sheet and the white image print side of the second sheet, or the unprinted side of the first sheet and the white image print side of the third sheet.

9. The image inspection apparatus according to claim 8, wherein one of the first image noise diagnosis pattern and the second image noise diagnosis pattern has a horizontal band chart for diagnosing a vertical streak of a process color, and the other pattern includes a vertical band chart for diagnosing a horizontal streak having a process color.

10. The image inspection apparatus according to claim 5, wherein the hardware processor allows image adjustment for the image quality determined that the image adjustment is necessary in the diagnosis based on the basic image quality.

11. The image inspection apparatus according to claim 5, wherein, when it is determined that a detailed diagnosis is necessary in the diagnosis based on the image noise, the hardware processor advances to the detailed diagnosis in which factors of generating an image noise specified that the detailed diagnosis is necessary are diagnosed in details.

12. The image inspection apparatus according to claim 11, wherein the hardware processor performs a control for reducing the image noise by adjusting a parameter of the imaging process or by performing an event relating to the imaging process or a control for narrowing the generating factor by comparing images before and after the event in the detailed diagnosis.

13. The image inspection apparatus according to claim 12, wherein the event includes idling of an intermediate transfer belt, charging electrode cleaning, refreshing of a photoreceptor surface layer, or a control for operating an adjustment mechanism in any one of imaging processes of biased development in the image forming part.

14. The image inspection apparatus according to claim 5, wherein the hardware processor diagnoses necessity of image adjustment from the read image of the first side of the second sheet for a part of the basic image quality, and diagnoses necessity of image adjustment from the read image of the first side of the first sheet for a part of the image noise.

15. The image inspection apparatus according to claim 14, wherein the hardware processor diagnoses necessity of image adjustment from the read image of the first image noise diagnosis pattern of the second chart for a part of the basic image quality, and diagnoses necessity of image adjustment from the read image of the basic image of the first chart for a part of the image noise.

16. The image inspection apparatus according to claim 8, wherein the hardware processor diagnoses a white dot as a part of the image noise from a halftone image printed on the second side of the third sheet.

17. The image inspection apparatus according to claim 16, wherein the hardware processor diagnoses a white dot as a part of the image noise using a recording medium having a sheet moisture content that can easily change before and after fixation.

18. The image inspection apparatus according to claim 1, further comprising a reading part that reads an image on the recording medium, wherein the reading part is an inline scanner provided in a rear stage of an image forming apparatus.

* * * * *